United States Patent
Utkovski et al.

(10) Patent No.: US 11,405,158 B2
(45) Date of Patent: Aug. 2, 2022

(54) SIGNATURE-DOMAIN MULTIPLEXING FOR NON-ORTHOGONAL MULTIPLE ACCESS

(71) Applicant: Fraunhofer-Gesellschaft zur Foerderung der angewandten Forschung e.V., Munich (DE)

(72) Inventors: Zoran Utkovski, Berlin (DE); Johannes Dommel, Berlin (DE); Sameh Eldessoki, Berlin (DE); Stephan Faehse, Berlin (DE); Lars Thiele, Berlin (DE); Martin Kasparick, Berlin (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 111 days.

(21) Appl. No.: 17/062,463

(22) Filed: Oct. 2, 2020

(65) Prior Publication Data

US 2021/0036831 A1 Feb. 4, 2021

Related U.S. Application Data

(63) Continuation of application No. PCT/EP2019/058630, filed on Apr. 5, 2019.

(30) Foreign Application Priority Data

Apr. 5, 2018 (EP) .................... 18165952

(51) Int. Cl.
*H04L 5/00* (2006.01)
*H04J 11/00* (2006.01)
*H04W 72/04* (2009.01)

(52) U.S. Cl.
CPC ........ *H04L 5/0053* (2013.01); *H04J 11/0026* (2013.01); *H04L 5/0007* (2013.01); *H04W 72/042* (2013.01)

(58) Field of Classification Search
CPC .. H04L 5/0053; H04L 5/0007; H04J 11/0026; H04W 72/042
See application file for complete search history.

(56) References Cited

U.S. PATENT DOCUMENTS

2014/0169408 A1* 6/2014 Bayesteh .......... H04L 25/03898
375/144
2019/0349897 A1* 11/2019 Hosseini ............... H04L 5/0053

FOREIGN PATENT DOCUMENTS

JP  2001175169 A  6/2001
WO 2016134663 A1  9/2016

OTHER PUBLICATIONS

"Design Impact on Reliability for LTE URLLC", 3GPP TDOC R1-1719503, 2017.

(Continued)

*Primary Examiner* — Hashim S Bhatti
(74) *Attorney, Agent, or Firm* — Perkins Coie LLP; Michael A. Glenn

(57) ABSTRACT

A user equipment for operating in a wireless network, wherein the wireless network utilizes a first number of resources for serving communicating UEs, comprises a wireless interface for communicating in the wireless network; and a controller configured for selecting, for communicating in the wireless network, from a second number of predefined subsets of the first number of resources, at least one subset. The second number is larger than the first number and the second number of predefined subsets is based on a mapping of the first number of resources into the second number of subsets using an Euler-square mapping.

23 Claims, 12 Drawing Sheets

(56) References Cited

OTHER PUBLICATIONS

Hoshyar, Reza, et al., "Novel low-density signature for synchronous CDMA systems over AWGN channel", IEEE Transactions on Signal Processing, vol. 56, No. 4, pp. 1616-1626, Apr. 2008, XP011205892, pp. 1616-1626.

Macneish, Harris, "Euler squares", Annals of Mathematics, vol. 23, No. 3, pp. 221-227, 1922 (online). Available: http://www.jstor.org/stable/1967920, pp. 221-227.

Nikopour, Hosein, et al., "Sparse code multiple access", 2013 IEEE 24th Annual International Symposium on Personal, Indoor, and Mobile Radio Communications (PIMRC), Sep. 2013, pp. 332-336, pp. 332-336.

Shental, Ori, et al., "Low-density code-domain NOMA: Better be regular", 2017 IEEE International Symposium on Information Theory (ISIT), Jun. 2017, pp. 2628-2632; XP033140566, pp. 2628-2632.

Taherzadeh, Mahmoud, et al., "SCMA codebook design", 2014 IEEE 80th Vehicular Technology Conference (VTC2014—Fall), Sep. 2014, pp. 1-5; XP032694934, pp. 1-5.

Verdu, Sergio, et al., "Spectral efficiency of CDMA with random spreading", IEEE Transactions on Information Theory, vol. 45, No. 2, pp. 622-640, Mar. 1999; XP011027309, pp. 622-640.

Yoshida, Mika, et al., "Analysis of sparsely-spread CDMA via statistical mechanics", 2006 IEEE International Symposium on Information Theory, Jul. 2006, pp. 2378-2382; XP031032643, pp. 2378-2382.

\* cited by examiner

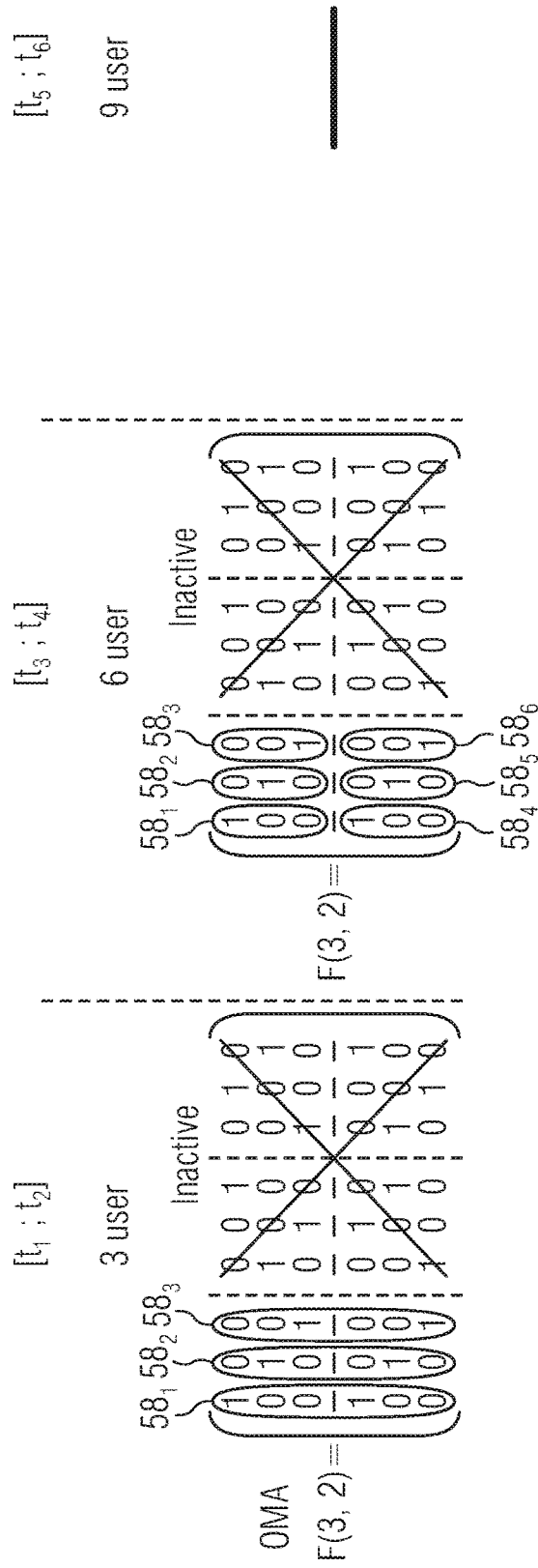
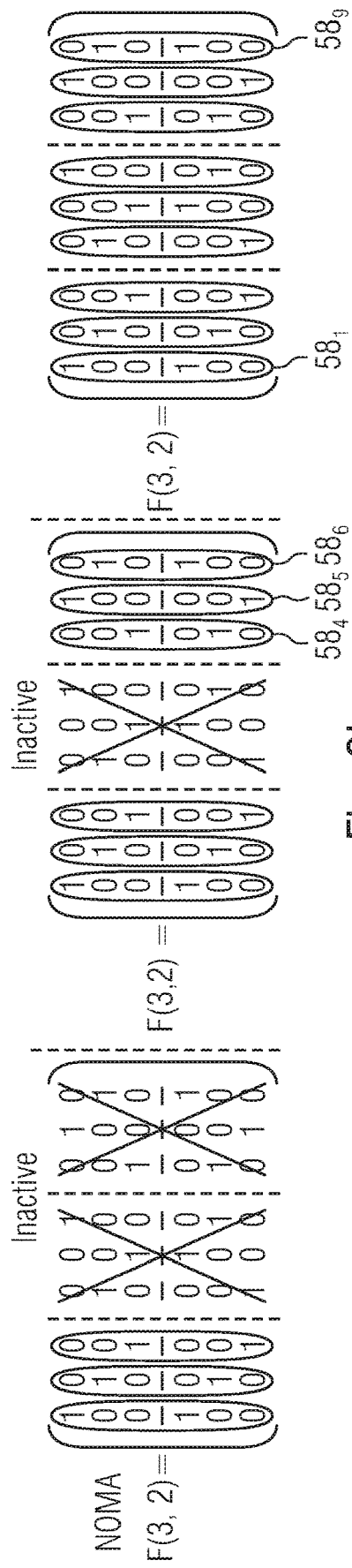

1

SIGNATURE-DOMAIN MULTIPLEXING FOR NON-ORTHOGONAL MULTIPLE ACCESS

CROSS-REFERENCE TO RELATED APPLICATIONS

This application is a continuation of copending International Application No. PCT/EP2019/058630, filed Apr. 5, 2019, which is incorporated herein by reference in its entirety, and additionally claims priority from European Application No. EP 18165952.5, filed Apr. 5, 2018, which is also incorporated herein by reference in its entirety.

The present application relates to the field of wireless communication networks or systems, more specifically to systems providing for a reliable communication. Embodiments relate to an approach allowing scalable overloading of resources and in particular to a signature-domain multiplexing for non-orthogonal multiple access.

BACKGROUND OF THE INVENTION

FIG. 1 is a schematic representation of an example of a terrestrial wireless network 100 including a core network 102 and a radio access network 104. The radio access network 104 may include a plurality of base stations $gNB_1$ to $gNB_5$, each serving a specific area surrounding the base station schematically represented by respective cells $106_1$ to $106_5$. The base stations are provided to serve users within a cell. The term base station, BS, refers to as gNB in 5G networks, eNB in UMTS/LTE/LTE-A/LTE-A Pro, or just BS in other mobile communication standards. A user may be a stationary device or a mobile device. Further, the wireless communication system may be accessed by mobile or stationary IoT devices which connect to a base station or to a user. The mobile devices or the IoT devices may include physical devices, ground based vehicles, such as robots or cars, aerial vehicles, such as manned or unmanned aerial vehicles (UAVs), the latter also referred to as drones, buildings and other items or devices having embedded therein electronics, software, sensors, actuators, or the like as well as network connectivity that enable these devices to collect and exchange data across an existing network infrastructure. FIG. 1 shows an exemplary view of only five cells, however, the wireless communication system may include more such cells. FIG. 1 shows two users $UE_1$ and $UE_2$, also referred to as user equipment, UE, that are in cell $106_2$ and that are served by base station $gNB_2$. Another user $UE_3$ is shown in cell $106_4$ which is served by base station $gNB_4$. The arrows $108_1$, $108_2$ and $108_3$ schematically represent uplink/downlink connections for transmitting data from a user $UE_1$, $UE_2$ and $UE_3$ to the base stations $gNB_2$, $gNB_4$ or for transmitting data from the base stations $gNB_2$, $gNB_4$ to the users $UE_1$, $UE_2$, $UE_3$. Further, FIG. 1 shows two IoT devices $110_1$ and $110_2$ in cell $106_4$, which may be stationary or mobile devices. The IoT device $110_1$ accesses the wireless communication system via the base station $gNB_4$ to receive and transmit data as schematically represented by arrow $112_1$. The IoT device $110_2$ accesses the wireless communication system via the user $UE_3$ as is schematically represented by arrow $112_2$. The respective base station $gNB_1$ to $gNB_5$ may be connected to the core network 102, e.g. via the S1 interface, via respective backhaul links $114_1$ to $114_5$, which are schematically represented in FIG. 1 by the arrows pointing to "core". The core network 102 may be connected to one or more external networks. Further, some or all of the respective base station $gNB_1$ to $gNB_5$ may connected, e.g. via the S1 or X2 interface or XN interface in NR, with each other via respective backhaul links $116_1$ to $116_5$, which are schematically represented in FIG. 1 by the arrows pointing to "gNBs". The wireless network or communication system depicted in FIG. 1 may by an heterogeneous network having two distinct overlaid networks, a network of macro cells with each macro cell including a macro base station, like base station $gNB_1$ to $gNB_5$, and a network of small cell base stations (not shown in FIG. 1), like femto or pico base stations.

For data transmission a physical resource grid may be used. The physical resource grid may comprise a set of resource elements to which various physical channels and physical signals are mapped. For example, the physical channels may include the physical downlink and uplink shared channels (PDSCH, PUSCH) carrying user specific data, also referred to as downlink and uplink payload data, the physical broadcast channel (PBCH) carrying for example a master information block (MIB) and a system information block (SIB), the physical downlink and uplink control channels (PDCCH, PUCCH) carrying for example the downlink control information (DCI), etc. For the uplink, the physical channels may further include the physical random access channel (PRACH or RACH) used by UEs for accessing the network once a UE synchronized and obtained the MIB and SIB. The physical signals may comprise reference signals (RS), synchronization signals and the like. The resource grid may comprise a frame or radioframe having a certain duration, like 10 milliseconds, in the time domain and having a given bandwidth in the frequency domain. The frame may have a certain number of subframes of a predefined length, e.g., 2 subframes with a length of 1 millisecond. Each subframe may include two slots of 6 or 7 OFDM symbols depending on the cyclic prefix (CP) length. A frame may also consist of a smaller number of OFDM symbols, e.g. when utilizing shortened transmission time intervals (sTTI) or a mini-slot/non-slot-based frame structure comprising just a few OFDM symbols.

The wireless communication system may be any single-tone or multicarrier system using frequency-division multiplexing, like the orthogonal frequency-division multiplexing (OFDM) system, the orthogonal frequency-division multiple access (OFDMA) system, or any other IFFT-based signal with or without CP, e.g. DFT-s-OFDM. Other waveforms, like non-orthogonal waveforms for multiple access, e.g. filter-bank multicarrier (FBMC), generalized frequency division multiplexing (GFDM) or universal filtered multi carrier (UFMC), may be used. The wireless communication system may operate, e.g., in accordance with the LTE-Advanced pro standard or the 5G or NR, New Radio, standard.

In the wireless communication network as shown in FIG. 1 the radio access network 104 may be a heterogeneous network including a network of primary cells, each including a primary base station, also referred to as a macro base station. Further, a plurality of secondary base stations, also referred to as small cell base stations, may be provided for each of the macro cells.

In addition to the above described terrestrial wireless network also non-terrestrial wireless communication networks exist. FIG. 2 is a schematic representation of an example of a non-terrestrial wireless communication network 150 including a core network 152 and a radio access network 154. Other than the terrestrial wireless network of FIG. 1, the non-terrestrial wireless network 150 includes a plurality of spaceborne transceivers 156, like satellites, and/or airborne transceivers 158, like unmanned aircraft systems. The respective spaceborne or airborne transceivers 156, 158 may be implemented in respective spaceborne or airborne vehicles, like the above mentioned satellites or unmanned aircraft systems. The transceivers 156 and 158 are provided to serve one or more users, like the UE or the IoT device 110 shown in FIG. 2, which are provided on or above ground 160. The UE and the IoT device may be devices as described above with reference to FIG. 1. The arrows $158_1$ to $158_4$ schematically represent uplink/downlink connections for communicating data between the user UE, 110 and the respective transceiver 156, 158. The transceivers 156, 158 are connected to the core network 152 as is schematically represented by the arrows $162_1$, $162_2$. The above described non-terrestrial wireless communication network or system may operate in a similar way as the terrestrial system described above with reference to FIG. 1, for example in accordance with the LTE-advanced pro standard or the 5G or NR, new radio, standard.

In wireless communication networks as described above, various services may be implemented. Some services may need an ultra-reliable communication, for example ultra-reliable low latency communication, URLLC, services. URLLC targets a high reliability at very low latencies so that systems implementing ultra-low latency services support round trip time, RTT, latencies of only a few milliseconds, for example 1 ms RTT. To address such short RTT latencies, known approaches use the above mentioned short transmission time intervals, sTTIs. While the reduced RTT addresses the latency issue, there is still the reliability issue which is closely related to the reliability of the control information received at the UE. While improving the data channel may be straight-forward, for example by lowering the coding rate or by adapting the modulation and coding scheme, this is not so straight-forward in the control channel. For example, the supported lowest coding rate in the physical downlink control channel, PDCCH, may be limited due the substantially fixed, less flexible structure of the PDCCH. With regard to the receipt of control messages in the control channel the missing probability and the false positive probability are to be observed, especially for ultra-reliable service or for URLLC services. The missing probability is the probability to miss a control message, like a DCI message, in the control channel, and the false positive probability is the probability to erroneously detect or identify a control message not intended for the UE, which may happen, for example, in case a of blind decoding process that produces a valid CRC (see below) although the signal detected was no DCI message for the UE.

A downlink, DL, radio frame in a wireless communication network includes a PDCCH region which defines the locations or places where a specific PDCCH may be located. The PDCCH region is searched by the UEs. Each PDCCH carries a control message, like the downlink control information, DCI, package which is identified by the UE-specific radio network temporary identifier RNTI. The RNTI is encoded, for example, in the CRC attachment of the DCI. The DCI may be scrambled with the UE-specific RNTI, like the C-RNTI. FIG. 3 schematically illustrates an example of a PDCCH region having a plurality of PDCCHs formed of different numbers of control-channel elements, CCEs. Depending on the payload size of the DCI format to be transmitted and the channel conditions, the base station may select an appropriate aggregation level defining the number of CCEs to be used for transmitting the DCI packet. As can be seen from FIG. 3, the PDCCH search space is divided into a common search space, that may be monitored by all UEs which are served by a base station, and into a UE-specific search space that is monitored by at least one UE.

Each UE performs a blind decoding on the whole PDCCH region so as to find one or more DCI packets dedicated for this UE. The DCI packets indicate, for example, the resources and other parameters to be used during an upcoming data transmission.

As mentioned above, a UE may obtain its one or more DCI packages by searching the PDCCH region which includes a blind decoding/blind detection approach. FIG. 4 schematically illustrates the blind decoding process to find within the PDCCH region one or more DCI packages for a specific UE. FIG. 4 schematically illustrates the PDCCH region 200, also referred to as the PDCCH search space. Five DCI packages $DCI_1$ to $DCI_5$ illustrated in the PDCCH search space 200, and a specific UE including an appropriate decoder searches the PDCCH search space 200 for a valid CRC to find DCI packets for this specific UE. As it is depicted in FIG. 4, the convolutional decoder obtains from DCI package $DCI_2$ the data including the control data and the scrambled CRC. The control data and the scrambled CRC are separated, the scrambled CRC is descrambled using the UE specific RNTI, the resulting CRC is checked against the CRC calculated from the control data, and a match of the resulting CRC and the calculated CRC indicates that the DCI package $DCI_2$ is actually the control message for the UE which decoded the control message.

However, the blind decoding approach described above may also find a match due to random data in the PDCCH search space, i.e., data not representing a DCI message for the specific UE may be erroneously detected as a valid control message, also referred to as a false-positive DCI. Such a false decoding may occur with a probability of $P_{FA}=M \times 2^{-16}$, where M is the number of blind detection attempts carried out by the UE. For example, in wireless communication systems as described above the probability for such a false alarm rate may about $10^{-5}$ (see e.g., 3GPP TDOC R1-1719503: Design Impact on Reliability for LTE URLLC). In other words, when a control messages decoded from a control region of a radio signal by a receiver, like a UE, may be decoded erroneously, i.e., is actually not a control message for this UE, with a probability about $10^{-6}$. Basically, this is not a problem for standard or regular communication services. However, ultra-reliable communication services may need a probability for a packet error to be around $10^{-6}$ so that a false-positive DCI detected with a probability of about $10^{-6}$ a problem as the UE, on the basis of the false-positive DCI, which may be a control message for another UE, causes the UE to configure itself for a data transmission on resources where no data for the UE is received so that the data transmission towards the UE may not be successful. This may lead to an additional delay until the UE, for example, in a subsequent downlink frame, decodes a correct or true-positive DCI allowing the UE to set its parameters for receiving data from the base station on the correct resources. Clearly, while such a delay might not be an issue in conventional or standard communication services, in services needing an ultra-reliable communication such decoding/detection of false-positive control messages may increase the delay.

It is noted that the information in the above section is only for enhancing the understanding of the background of the invention and therefore it may contain information that does not form conventional technology that is already known to a person of ordinary skill in the art.

SUMMARY

According to an embodiment, a user equipment, UE, for operating in a wireless network, wherein the wireless network utilizes a first number of resources for serving communicating UEs, may have: a wireless interface for communicating in the wireless network; a controller configured for selecting, for communicating in the wireless network, from a second number of predefined subsets of the first number of resources, at least one subset; wherein the second number is larger than the first number and wherein the second number of predefined subsets is based on a mapping of the first number of resources into the second number of subsets.

According to another embodiment, a base station, BS, for operating at least a cell of a wireless network such that the wireless network utilizes a first number of resources for serving communicating UEs, may have: a wireless interface for communicating in the wireless network; wherein the base station is configured for operating the wireless network so as to support communication of the UEs by use of at least one subset from a second number of predefined subsets of the first number of resources; wherein the second number is larger than the first number and wherein the second number of predefined subsets is based on a mapping of the first number of resources into the second number of subsets.

According to another embodiment, a network may have: at least one inventive UE; at least one inventive base station.

According to another embodiment, a method for operating a user equipment, UE, in a wireless network, wherein the wireless network utilizes a first number of resources for serving communicating UEs, may have the steps of: communicating in the wireless network; selecting, for communicating in the wireless network, from a second number of predefined subsets of the first number of resources, at least one subset; wherein the second number is larger than the first number and wherein the second number of predefined subsets is based on a mapping of the first number of resources into the second number of subsets.

According to another embodiment, a method for operating a base station such that a wireless network utilizes a first number of resources for serving communicating UEs, may have the steps of: communicating in the wireless network; and operating the wireless network so as to support communication of the UEs by use of at least one subset from a second number of predefined subsets of the first number of resources; wherein the second number is larger than the first number and wherein the second number of predefined subsets is based on a mapping of the first number of resources into the second number of subsets.

Another embodiment may have a non-transitory digital storage medium having a computer program stored thereon to perform the inventive methods when said computer program is run by a computer.

BRIEF DESCRIPTION OF THE DRAWINGS

Embodiments of the present invention will be detailed subsequently referring to the appended drawings, in which:

FIG. 9a shows a schematic illustration of an example scenario in which six resources operated by the base station are mapped using an Euler-square mapping according to an embodiment;

FIG. 9b shows a schematic representation of the scenario of FIG. 9a, orthogonal communication and also non-orthogonal communication is used according to an embodiment;

DETAILED DESCRIPTION OF THE INVENTION

Figure 1:
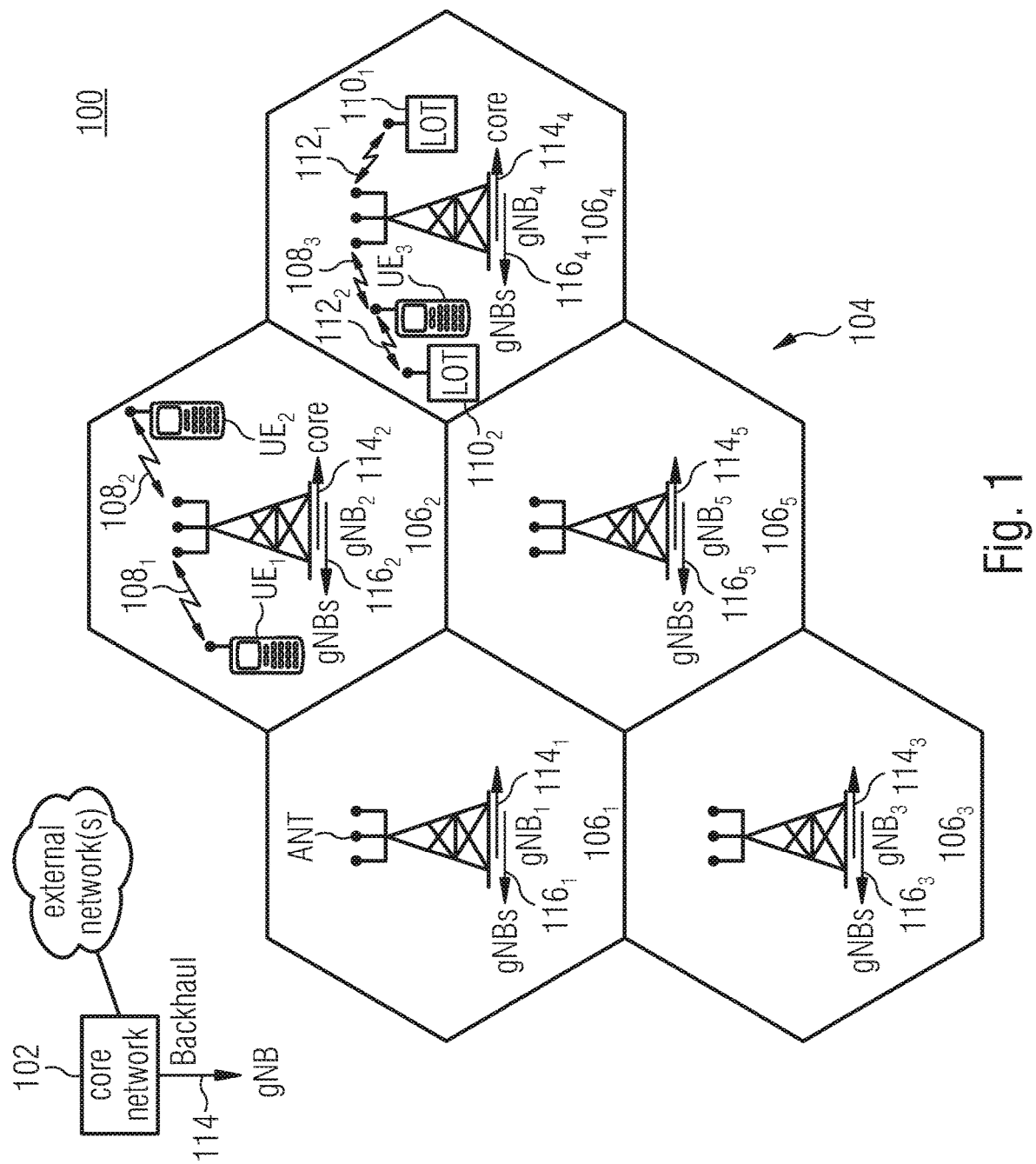
FIG. 1 shows a schematic representation of an example of a terrestrial wireless communication system.
Figure 2:
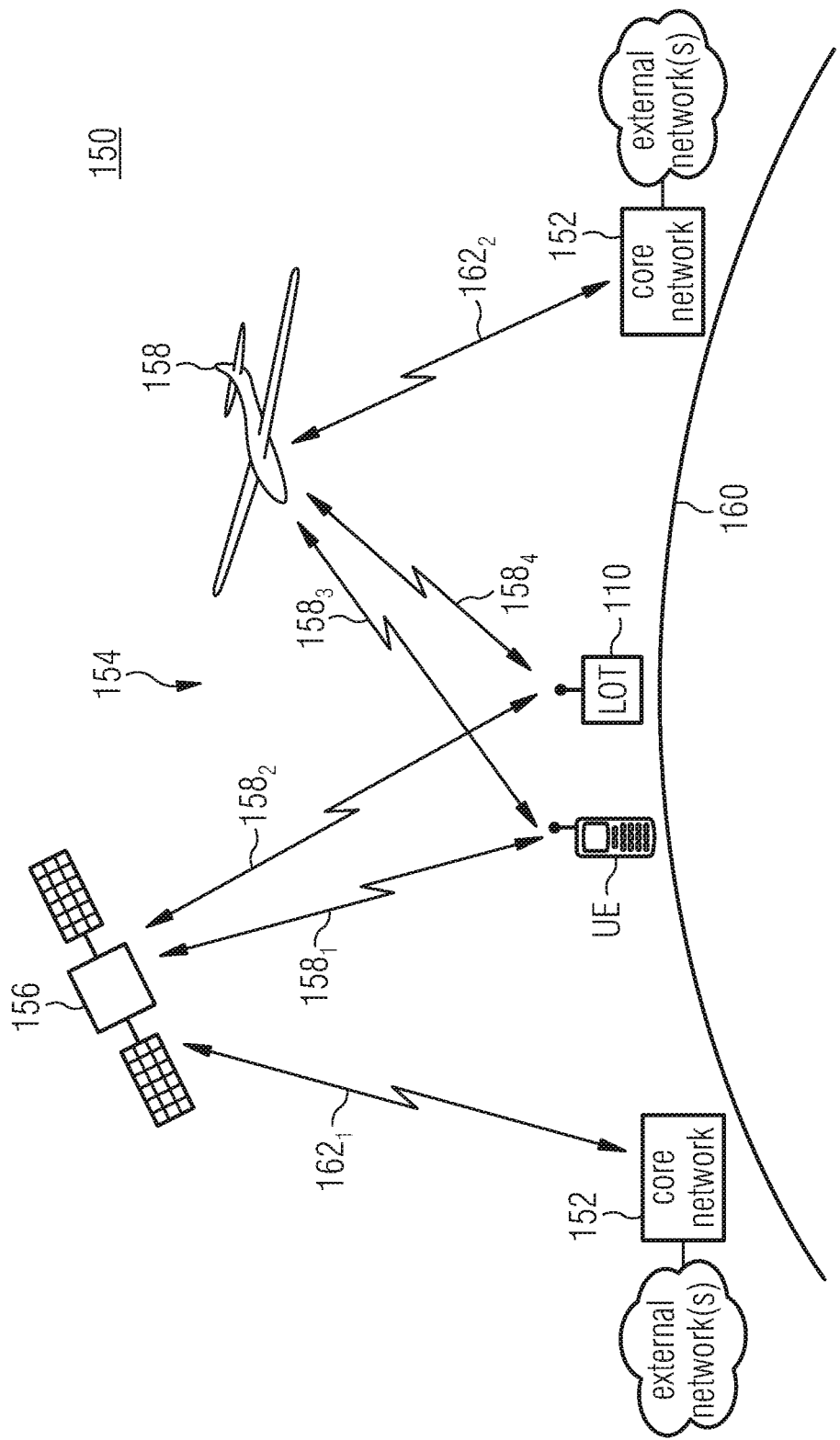
FIG. 2 is a schematic representation of an example of a non-terrestrial wireless communication network.
Figure 3:
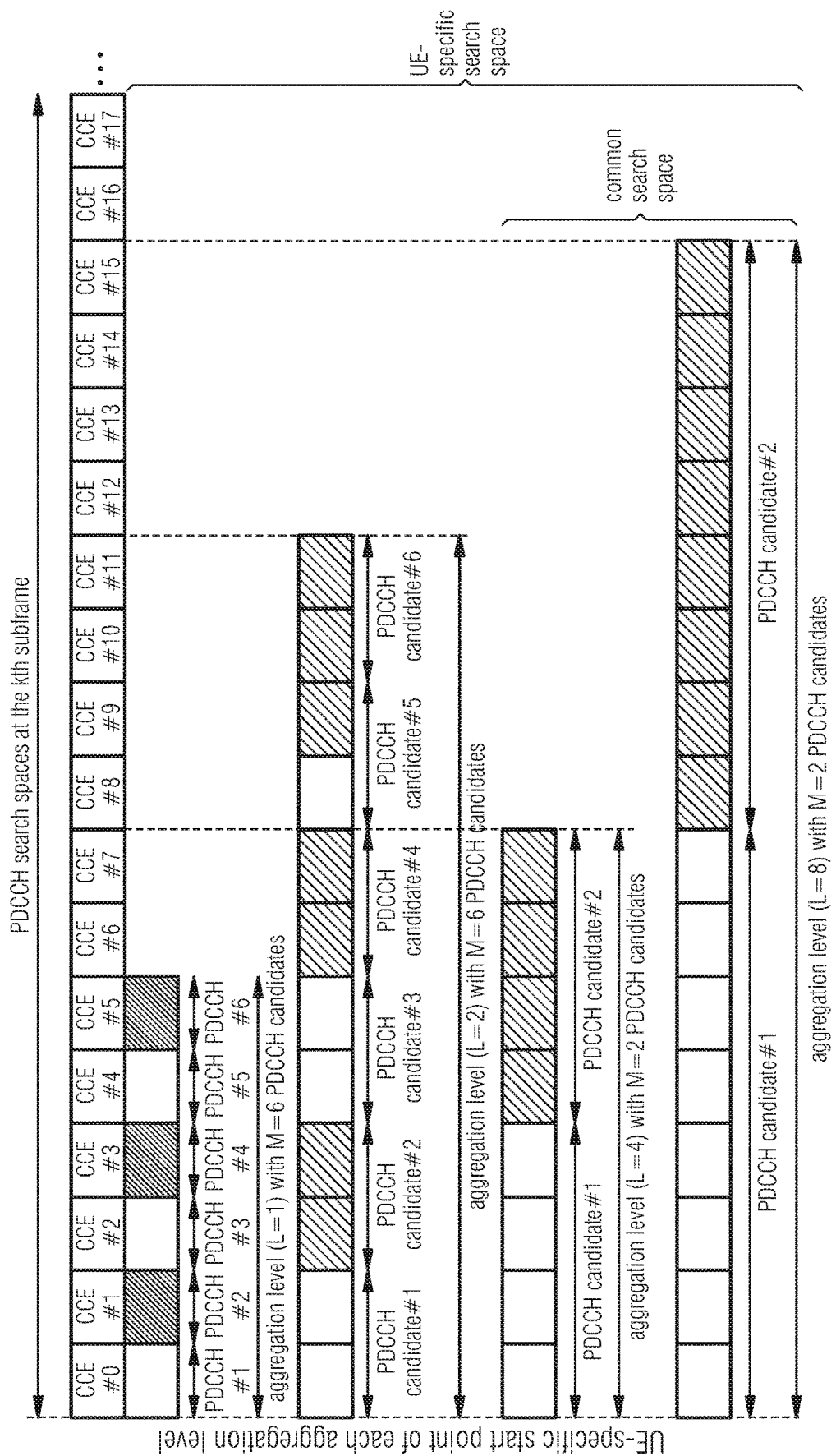
FIG. 3 schematically illustrates an example of a PDCCH region having a plurality of PDCCHs formed of different numbers of control-channel elements, CCEs.
Figure 4:
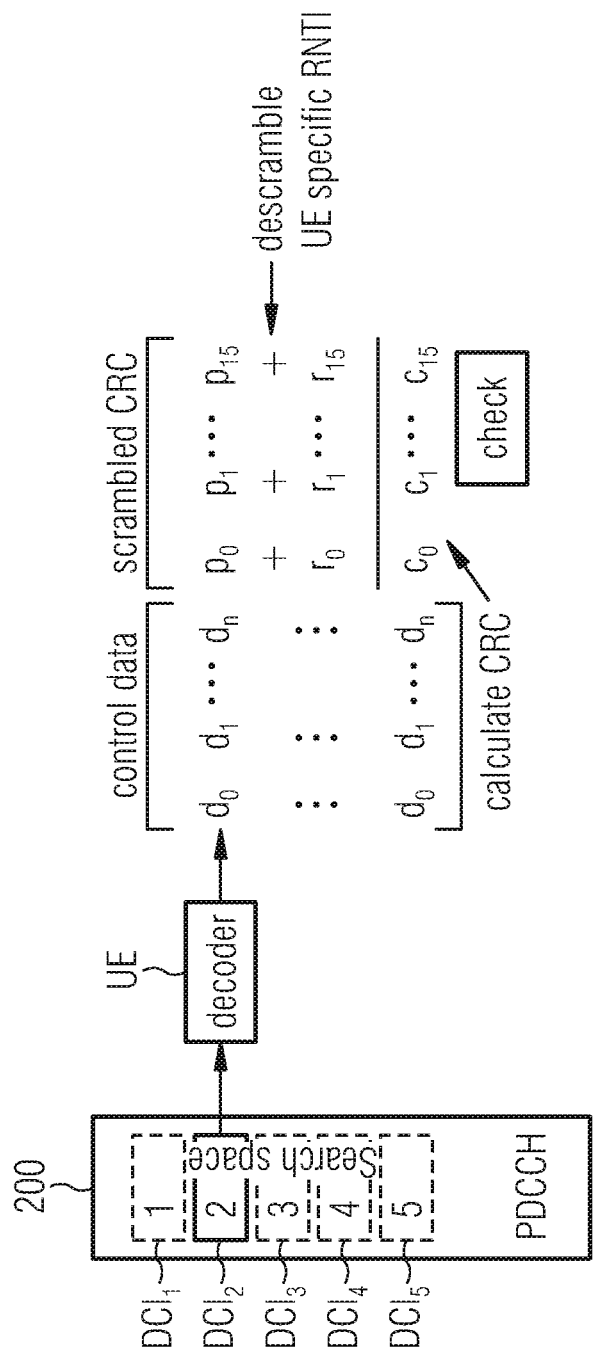
FIG. 4 schematically illustrates the blind decoding process to find within the PDCCH region one or more DCI packages for a specific UE.

Embodiments of the present invention are now described in more detail with reference to the accompanying drawings in which the same or similar elements have the same reference signs assigned.

To allow for a concept implementing a reliable communication, which additionally allows for a high throughput, a user equipment (UE) being configured for operating in the wireless network, the network utilizing a first number of resources for serving communicating UEs, comprises a wireless interface for communicating in the wireless network. Communicating refers to a transmission process and/or a reception process. The UE comprises a controller configured for selecting, for communicating in the wireless network, from a second number of predefined subsets of the first number of resources, at least one subset of resources. The second number is larger than the first number. The second number of predefined subsets is based on a mapping of the first number of resources into the second number of subsets. For such a mapping, the UE, e.g., the controller may be configured for using an Euler-square mapping or a mapping that is Euler square-based, e.g., by implementing some possible minor modifications. The Euler-square mapping allows for a scenario in which each resource is used by at least a first and a second subset therefore rendering the subsets as non-orthogonal. In accordance with the signature-based approach, the pattern of resource elements contained in each of the subset may be unique in a common resource map such that a transmitter and/or receiver may be identified by identifying the pattern of resource elements. Although embodiments are described hereinafter as relating to an Euler square based mapping, the embodiments are not limited hereto but also relate to embodiments with other mapping schemes that lead to non-orthogonal subsets that are multiply used.

In connection with embodiments described herein, resources may refer to a single or to a multitude or to a plurality of resources usable in a wireless communication network, amongst which there are time, frequency, transmission power, space and code. For example, a resource may be a single sub-carrier (frequency domain) used for a specific time (time domain). For example, a resource may also be an aggregation of such resources, for example, aggregated to a fading block containing a set of resources being considered to provide for a homogeneous channel fading. For example, a resource may comprise a code being used for a specific time and/or frequency slot. Thus, also the fading blocks may be considered as resources. A specific type of resource and/or an amount thereof, e.g., a number of sub-carriers and/or time slots aggregated in a fading block may thus vary dependent on a granulation of the wireless network. In connection with the embodiments described herein, a resource element is considered as a fading block, wherein other implementations are possible, without any limitation.

Non-orthogonal multiple-access (NOMA) is a main enabler of the new radio (NR) design of 5G cellular networks and beyond. The underlying idea is to loosen the paradigm of orthogonal transmissions by allowing different users (or layers) to concurrently share the same physical resources, in either time, frequency or space or code or transmission power. Consequently, more connections can be supported in massive Machine-Type-Communications (mMTC), or alternatively, a higher throughput can be achieved in enhanced Mobile Broadband (eMBB) scenarios. Given the current spectral constraints, radio access techniques are needed where the User Equipments (UEs) share the wireless resources in a non-orthogonal fashion, be it in the initial access phase or the data transmission phase (or both, as in the case of a joint initial access and data transmission scheme). Examples include the concept of non-orthogonal multiple-access (NOMA), which relies on power-domain or code-domain multiplexing, with corresponding schemes including power-domain NOMA, multiple-access with low-density spreading, sparse code multiple-access, multi-user shared access, pattern division multiple access, to name a few. Other examples are the communications schemes where the UEs simultaneously perform initial access and communicate information to a joint receiver by transmitting non-orthogonal information-bearing sequences over a block of shared channel resources (time-frequency slots). The concept generalizes two multiplexing layers across shared resources, where different layers may correspond to different users, but also to the same user multiplexing messages over the same resources as, e.g., in broadcast or multicast scenarios. An important aspect of non-orthogonal multiple access is the code design, i.e., the predefined structure according to which the information-carrying messages of the individual layers are mapped to the shared resources.

The plethora of NOMA techniques can be roughly categorized into two main classes: signature-domain multiplexing and power-domain multiplexing. In the latter class, signals corresponding to different users are superimposed, and commonly decoded via successive interference cancellation (SIC). Signature-domain multiplexing is based on distinguishing spreading codes, or interleaver sequences (concatenated with low-rate error-correcting codes). Low-density code-domain (LDCD) NOMA is a prominent sub-category of signature-based multiplexing, which relies on low-density signatures (LDS) as described in [1]. Sparse spreading codes comprising a small number of non-zero elements are employed for linearly modulating each user's symbols over shared physical resources. Significant receiver complexity reduction can be achieved by utilizing message-passing algorithms (MPAs), which enable user separation even when the received powers are comparable (as opposed to power-domain NOMA). Different variants of LDCD-NOMA have gained much attention in 5G 3GPP standardization. For instance, Sparse-Code Multiple-Access (SCMA) as described in [2] and [3] further optimize the low-density sequences to achieve shaping and coding gains by using multidimensional constellations. The sparse mapping between users and resources in LDCD-NOMA can be either regular, where each users occupies a fixed number of resources, and each resource is used by a fixed number of users; or irregular, where the respective numbers are at random, and only fixed on average. The optimal spectral efficiency of irregular LCDC-NOMA is investigated in [4], and shown to result the below the well-known spectral efficiency of dense random-spreading (RS), as described in [5]. The result stems from the random nature of the user-resource mapping, due to which some users may end up without any designated resources, while some resources may be left unused. On the other hand, regular user-resource mappings have shown potential benefits, as addressed in [6].

Figure 5:
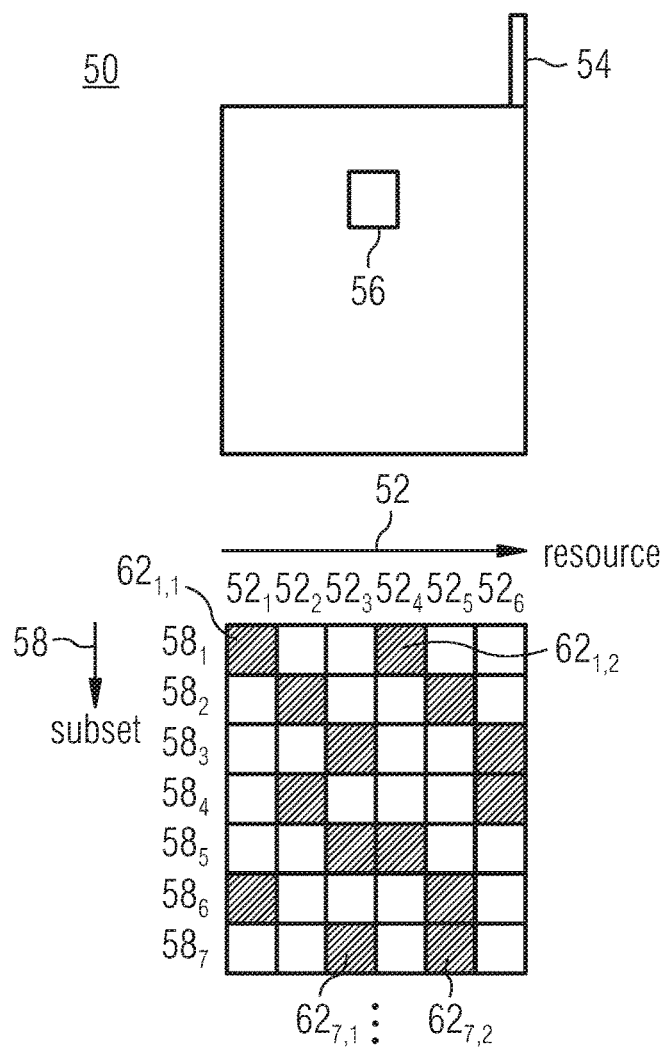
FIG. 5 shows a schematic block diagram of a user equipment according to an embodiment.

FIG. 5 shows a schematic block diagram of a user equipment 50 according to an embodiment. The user equipment 50 may be configured for operating in a wireless network, for example, in the wireless network 100 or 150. By way of example, the network may utilize a number of resources 52, the resources 52 comprising one or more of at least a code, a time, a frequency and/or a space as described above.

The user equipment 50 may comprise a wireless interface 54, such as an antenna arrangement comprising at least one antenna, for communicating in the wireless network. The user equipment may be configured for performing beamforming or similar features with the wireless interface but is not needed to do so. The user equipment may further comprise a controller 56 configured for selecting at least one subset 58 of resources 52 from a number of predefined subsets. The predefined subsets 58 may be known to the user equipment 50 prior to the start of data exchange. For example, the predefined subsets may be known by way of exchanging information via broadcast channels. Alternatively or in addition such information may be stored in a memory and may be accessible for the controller 56 so as to be in conformity with a communication standard or the like. The predefined subsets 58 may be a fixed or a variable information.

The example resource table shows resources $52_1$ to $52_6$ and their allocation or association to the subsets $58_1$ to $58_7$. The number of subsets $58_1$ to $58_7$ is larger when compared to the number of resources $52_1$ to $52_6$, i.e., at least one resource 52 is used in more than one subset 58 rendering the subsets 58 as non-orthogonal. As will be described in more detail in the following, the pattern of association of the resources 52 to the subsets 58 is implemented according to an Euler-square pattern.

Hatched resources $62_{i,j}$ from the resources 52 indicate the respective association, wherein index i indicates the subset to which the respective resource is associated and the index j indicates a counter counting of the number of resources in the associated subset. For example, the resource $62_{1,1}$ is the first resource of the first subset, where in the resource $62_{7,2}$ is the second resource of the seventh subset.

By using Euler squares, distinct patterns of used resources may be obtained, the distinct patters allowing for a signature-based multiplexing. Embodiments therefore relate to a general form of signature-based multiplexing according to which, after the synchronous layer-multiplexing, the received signal matrix $Y^{(q)}$ over the fading block $FB_q$ (i.e. over the nc=ns·no resource elements within the block) can be expressed as $$Y^{(q)} = \sum_{j=1}^{J} \lambda_j h_j^{(q)} \text{diag}(f_j^{(q)}) X_j^{(q)} + W^{(q)}, q = 1, \ldots, Q$$

where $\lambda_j \in \{0,1\}$ is a random binary variable denoting user activity (layer presence) in the resource frame, the ns·no matrix $x_j^{(q)}$ represents the signal of user/layer j (when active/present) sent over the nc=ns*no resource elements in the FB q; $f_j^{(q)}$ is the ns-dimensional signature vector associated with user j in FB q, describing the mapping of the transmit signal on the ns subcarriers; $h_j^{(q)}$ is the fading coefficient of user/layer j and $w^{(q)}$ is the additive noise matrix at the receiver. It is important to note that the assembling of the time-frequency slots in fading blocks experiencing the same channel conditions (i.e. the same channel realization) provides certain flexibility in the construction of the transmit code words due to the symmetry between the frequency and the time dimension within one fading block. This, for example can be used to trade bandwidth with latency requirements (and vice versa).

A signal construction, i.e., determining patters used in the resource map may be based on the consideration that the overall performance of NOMA transmission schemes with sparse signatures may at least be influenced on the construction of the signatures associated with the individual users (layers), which may be assembled in the matrix $$F = \begin{pmatrix} F^{(1)} \\ \vdots \\ F^{(Q)} \end{pmatrix}$$

where $F^{(q)}$ stacks the signature vectors of the J users within the q-th FB, $F^{(q)}=(f_1^{(q)} \ldots f_J^{(q)})$. Embodiments propose a signature-based flexible construction for NOMA based on the concept of Euler Squares [7].

Euler squares allow for a high or wide spreading of the used resources amongst all of the resources obtained. Some of the constraints with respect to Euler squares are defined by.

An Euler square of order n, degree k and index n,k is a square array of $n^2$ k-ads (k-ad denotes a set of k elements) of numbers, $(q_{ij1}, a_{ij2}, \ldots, a_{ijk})$, where $a_{ijr} \in \{0, 1, 2, \ldots, n-1\}$; r=1,2,…,k; i,j=1,2,…,n; n>k; $a_{ipr} \neq a_{iqr}$ and $a_{pjr} \neq a_{qjr}$ for p≠q and $(a_{ijr}+1)(a_{ijs}+1) \neq (a_{pqr}+1)(a_{pqs}+1)$ for i≠p and j≠q.

Explicit constructions of Euler Squares are known to exist for the following cases [7]
1) Index p, p-1, where p is a prime number;
2) Index $p^r$, $p^r$-1 for p being a prime number;
3) Index n, k where $n = 2^r p_1^{r_1} p_2^{r_2} \ldots p_l^{r_l}$ for-distinct odd primes $p_1, p_2, \ldots, p_l$. Here, $k+1 = \min \{2^r p_1^{r_1} p_2^{r_2} \ldots p_l^{r_l}\}$.

Furthermore, the existence of the Euler Square of index n, k implies that the Euler Square of index n, k' also exists, where k'<k.

Based on these insights, for n≥3, k≥2, the matrix F of size n·k × $n^2$ is constructed as follows: For 1≤i≤n·k, 1≤j≤$n^2$, $$f_{ij} = \begin{cases} 1 & \text{if } (a_j)_{\lfloor \frac{i-1}{n} \rfloor + 1} \equiv i - 1 \pmod{n} \\ 0 & \text{otherwise} \end{cases}$$

where $(a_j)$ is the j-th k-ad, $(a_j)_l$ is the l-th element in the j-th k-ad, [x] denotes the largest integer not greater than x, and mod denotes the modulo operation. With this construction, the j-th signature associated with user (layer) j=1, 2, …, $n^2$ (the j-th column of F) is generated as an nk-binary vector from the j-th k-ad $(a_j)$ with 1 occurring at the positions (l-1)n+(($a_j)_l$+1) for l=1, 2, …, k.

The matrix F is effectively a block matrix consisting of k number of n×$n^2$ blocks, where there are exactly k ones in each column of F. Each of the users' (layers') signatures (columns of F) correspond to a k-ad (set of k elements) in the Euler Square of index n; k.

The Euler square mapping is thus representable as a matrix having a structure F(n, k), in which n·k is the first number of resources and in which $n^2$ is the second number of subsets. The matrix F is structured so as to comprise a number of k entries indicating a use of resource elements in each of row and so as to comprise n entries indicating a use of resource elements in each column.

Figure 6A:
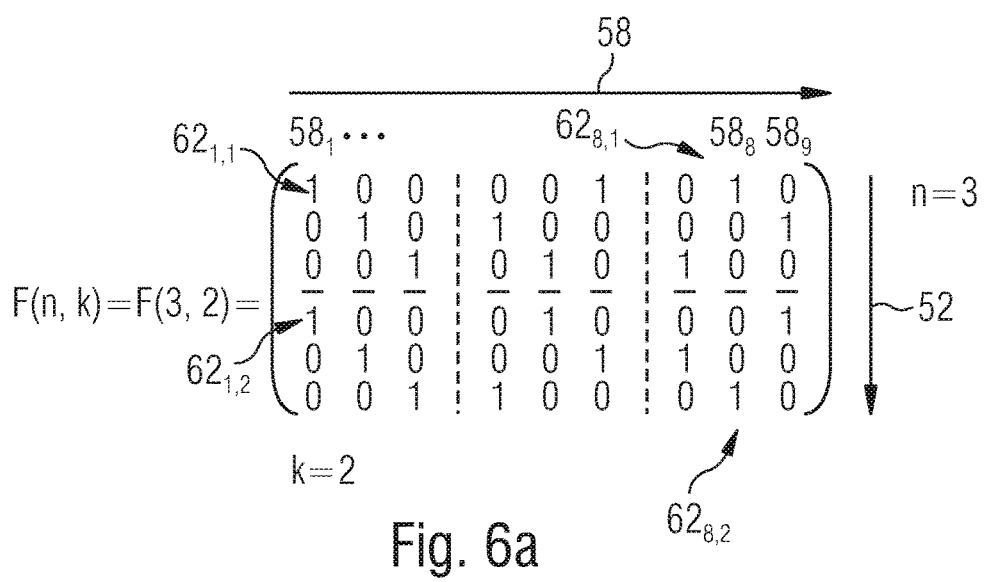
FIG. 6a shows an example Euler-square matrix illustrating resource allocation for an Euler-square matrix of form $F(3,2)$ for resource allocation according to an embodiment.

FIG. 6a shows an example Euler-square matrix for n=3 and k=2 yielding a matrix having nine columns and six lines.

Parameters n=3 and k=2 yield in a number of n·k=6 resources to be allocated and $3^2$=9 subsets to be obtained. As shown in FIG. 6a, the nine subsets each comprise two associated resource elements 62, i.e., the six resource elements 52 may be used by nine layers or users. As described in connection with FIG. 5, each user, user equipment or application may select more than one subset 58 for communication so as to increase bandwidth and/or reliability of communication.

The matrix F may allow, over all subsets, a high or even maximum spreading which is of benefit for enhancing communication of all layers or users because scenarios may be reduced or even avoided in which some subsets face a high beneficial spreading and others probably fully overlap so as to have no spreading which may lead in high error rates.

Although the resources of a first subset, e.g., resources $62_{1,1}$ and $62_{1,2}$ of subset $58_1$ and resources $62_{8,1}$ and $62_{8,2}$ of subset $58_8$ may be non-orthogonal with respect to each other, based on the different signatures of both subsets $58_1$ to $58_2$ in the resource map, both subsets may be distinguishable.

The patterns of resources, i.e., the used resources, may be regarded as a kind of code or signature allowing for distinguishing between different users. According to embodiments, the wireless network is operated as an OFDM-network. The generated code included in the subsets 58 defines how users use their resources. Based on the regular constructions, a number of overlappings between the resource subsets is limited and, additionally limits the number of resource elements used by each user. Further, the construction rules of Euler square mappings allow for a reconstruction and/or a constraint for solving separation of overlapping users.

Figure 6B:
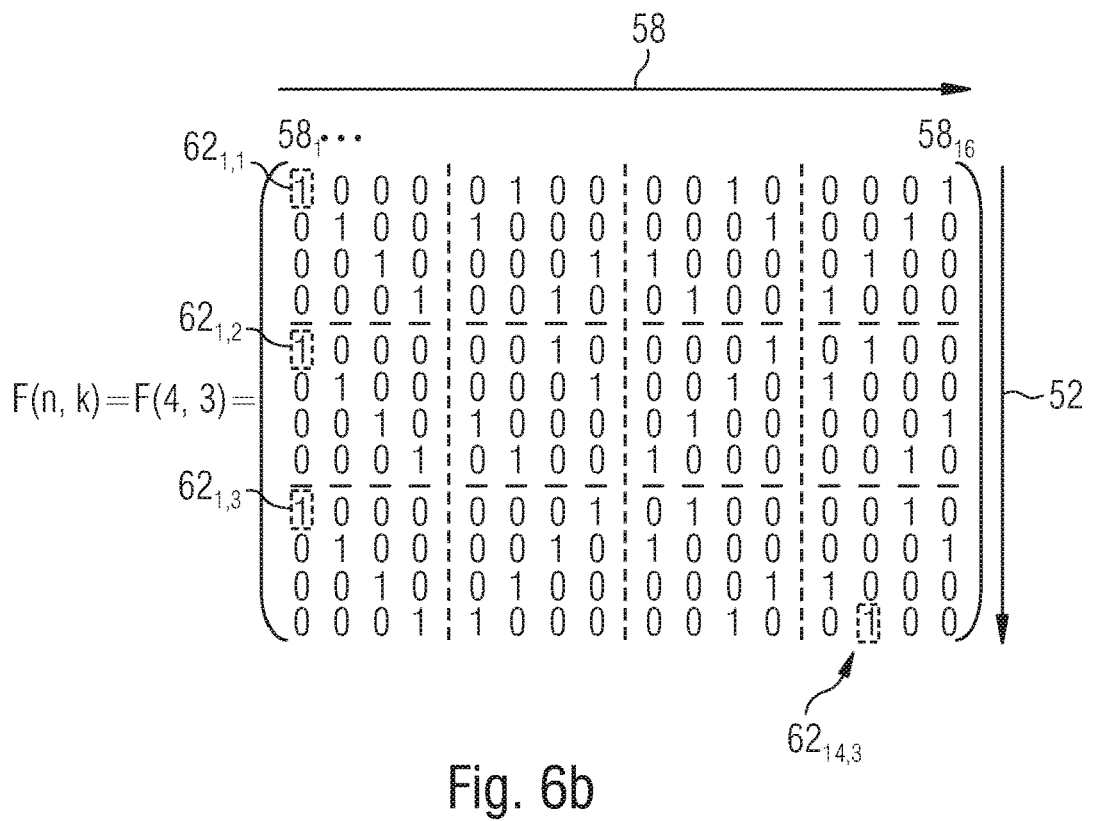
FIG. 6b shows a schematic representation of an Euler-square matrix of form $F(4, 3)$ for resource allocation according to an embodiment.

FIG. 6b shows a schematic representation of an Euler-square matrix having parameters n=4 and k=3, i.e., F(4, 3). The matrix yields in 4·3 resources to be allocated amongst $4^2=16$ subsets, wherein each subset $58_1$ to $58_{16}$ utilizes three resources 52. Providing the subsets 58 so as to comprise a common and equal value of used resources, e.g., two in FIG. 6a or three in FIG. 6b, according to embodiments, different subsets may utilize different numbers of resources.

Figure 6C:
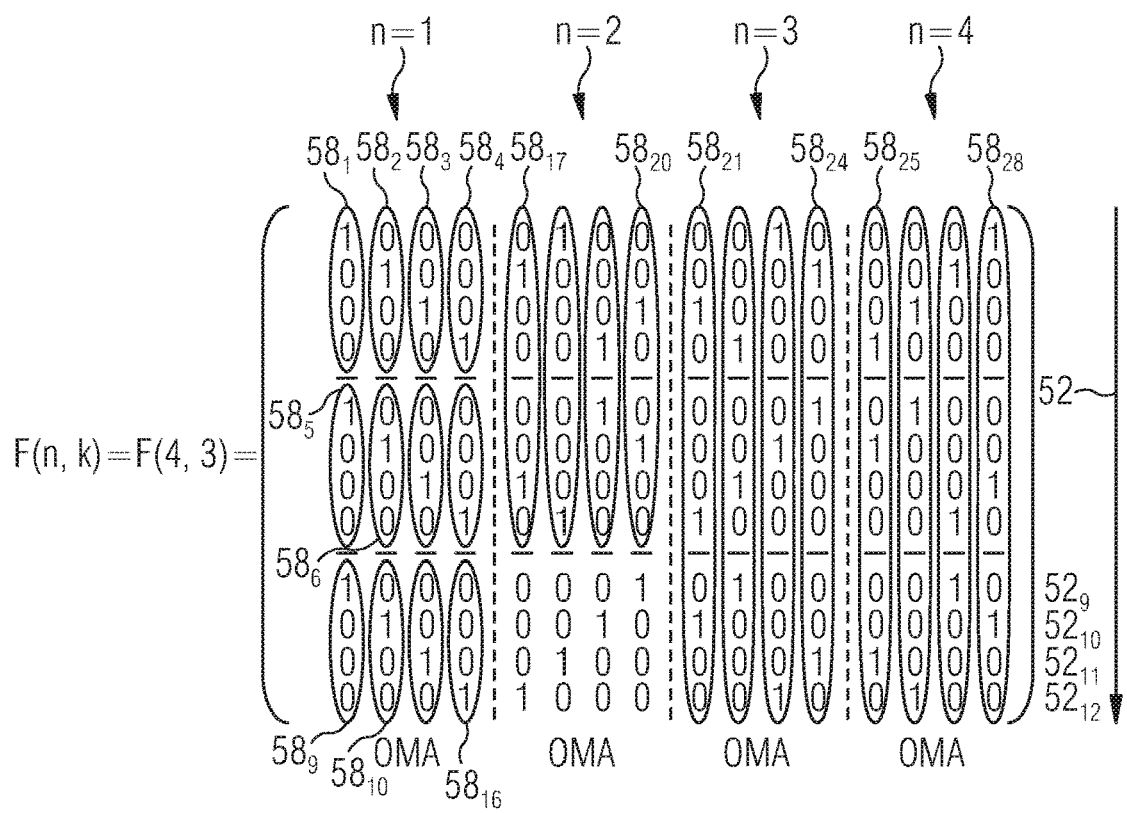
FIG. 6c shows an allocation of the resources of FIG. 6b to resource subsets having varying lengths, according to an embodiment.

As illustrated in FIG. 6c, showing a different generation of subsets $58_1$ to $58_{28}$ from the Euler-square matrix F(4, 3), being the same matrix when compared to FIG. 6b. In contrast to FIG. 6b in which a complete row is taken as representation of resource elements to be used within subsets 58 of equal size, according to FIG. 6c, subsets $58_1$ to $58_{28}$ of different length, i.e., number of resources to be used, may be used. When thus compared to FIG. 6a and FIG. 6 in which a complete column (based on the representation, also a line may be used) of the matrix F represents a subset 58 of resources 52, according to FIG. 6c, in sections of the matrix (n=1) and (n=2) only a part thereof may be used, wherein the columns (or lines) may be used so as to form more than one subset (n=1) and/or so as to define part of the column unused (n=2). Thus, based on a same Euler-square matrix, different concepts of deriving subsets of resources fall under the scope of embodiments. According to an embodiment, each column (or line) of the Euler-square matrix completely forms a subset. According to an embodiment at least one column is divided into sections, each section forming a subset (n=1). According to an embodiment, each column (or line) of the Euler-square matrix forms incompletely a subset (n=1 and n=2), i.e., a part of the column is unused by the subset and/or by different subsets. Although FIG. 6c is illustrated as hybrid embodiment according to which different sections/precoders are implemented so as to use or derive the subsets from the Euler-square matrix differently by way of three different construction rules (n=1; n=2; n=3 and n=4), according to an embodiment, one single rule may be used, two rules may be used or more than 3 may be used such as 4, 5, 6 or more.

As illustrated for the first four columns of matrix F(4, 3), representing, for example, a section n=1, each column may be sub-divided into three subsets $58_1$, $58_5$ and $58_9$, $58_2$, $58_6$ and $58_{10}$ and so on, wherein each of the subsets $58_1$ to $58_{16}$ comprises one resource element only.

The next four columns representing, for example, section n=2, may be formed into subsets $58_{17}$ to $58_{20}$, comprising two resource elements each, wherein one or more resources $52_9$ to $52_{12}$ may be unassociated to the subsets of section n=2.

Columns 9 to 16 belonging to sections n=3 and n=4 of matrix F(4, 3) may be included completely into one subset $58_{21}$ to $58_{28}$ respectively. Usage of subsets $58_1$ to $58_{16}$, $58_{17}$ to $58_{20}$, $58_{21}$ to $58_{24}$ and $58_{25}$ to $58_{28}$ within each section n=1, n=2, n=3 and n=4 allow for an orthogonal access within the respective set of subsets. Subsets of different lengths are, by definition, also orthogonal with respect to subsets of different lengths (different number of resources used). Thus, the configuration according to FIG. 6c, shows a derivation of 28 subsets for serving 28 user equipment, data streams or communication streams, wherein each subset provide for a different throughput as indicated by the number of resource elements used. Such data or communications streams may include any information such as user data or payload data, control information e.g., using control channels or reference symbols like, e.g., in PDSCH/PUSCH and/or any other channels.

Especially when referring to new radio, each resource element may comprise a same or different communication capability such as a bandwidth or a number of symbols to be transmitted within the resource element.

Both, matrices F(3,2) and F(4,3) show a comparable structure according to which:
- The number of ones (allocated resources) in each row in the matrix F is n;
- the number of ones (allocated resources) in each column of F is k;
- the overlap between the columns of F is at most 1 (i.e., the user/layer signatures overlap at most in one position); and
- the overloading factor is β=n/k.

According to embodiments, the Euler square mapping is performed or executed such that n and k are in accordance with the explanations given in in connection with the generation of Euler squares. For example, for F(3,2) the rule applies according to which "p, p-1" is selected for p=3. For example, for F(4,3) the rule applies according to which "$p^2$, $p^2$-1" is selected for p=2. According to further embodiment, different indices may be selected. For example, an option is to select index n, k suh that $n=2^r\,p_1^{r_1}\,p_2^{r_2}\ldots p_l^{r_l}$ for-distinct odd primes $p_1, p_2, \ldots, p_l$. Here, $k+1=\min\{2^r_{p_1}\,p_2^{r_2}\ldots p_l^{r_l}\}$.

Figure 7A:
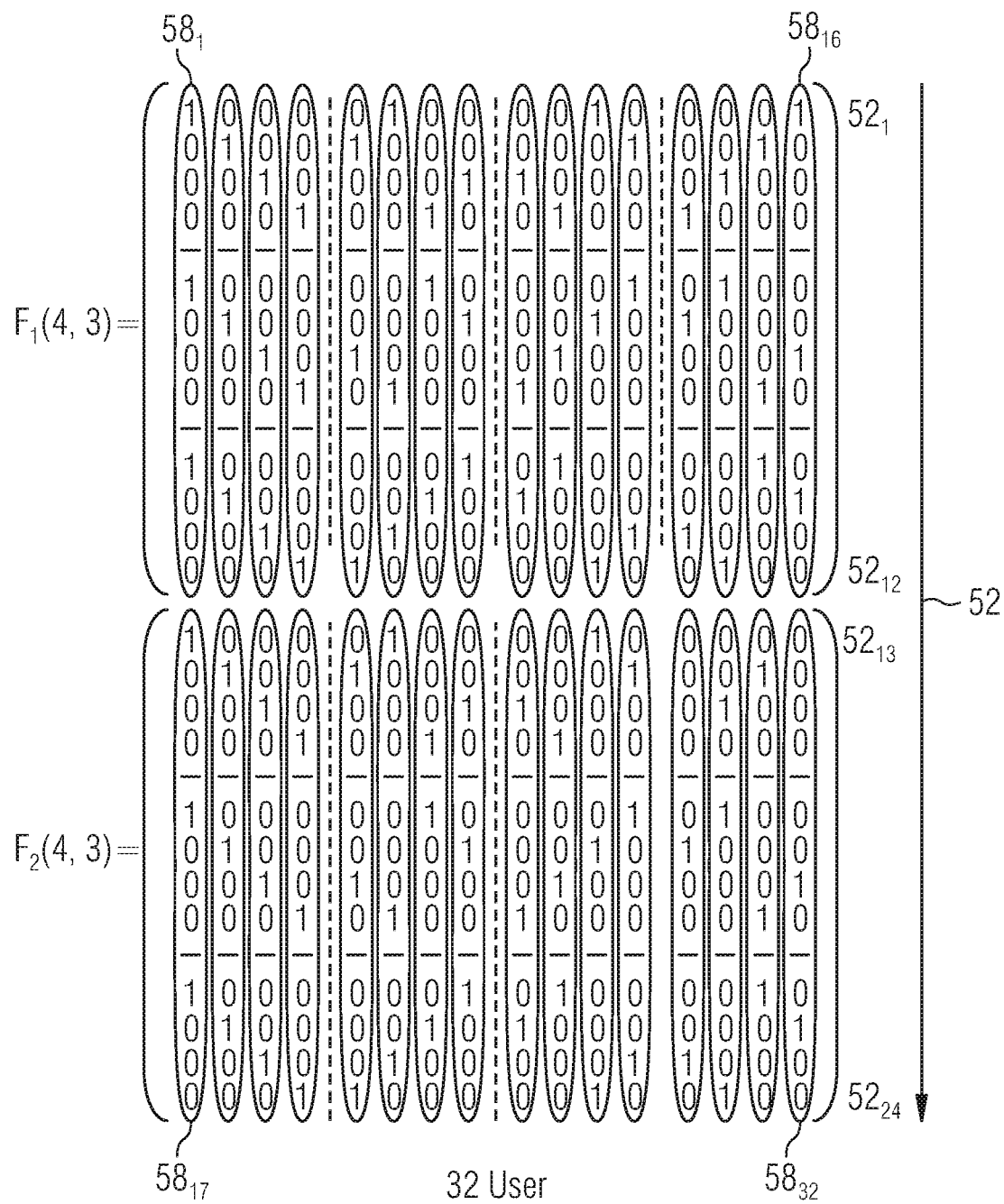
FIG. 7a shows a concept according to which a first matrix and a second matrix are used for generating subsets, according to an embodiment.
Figure 7B:
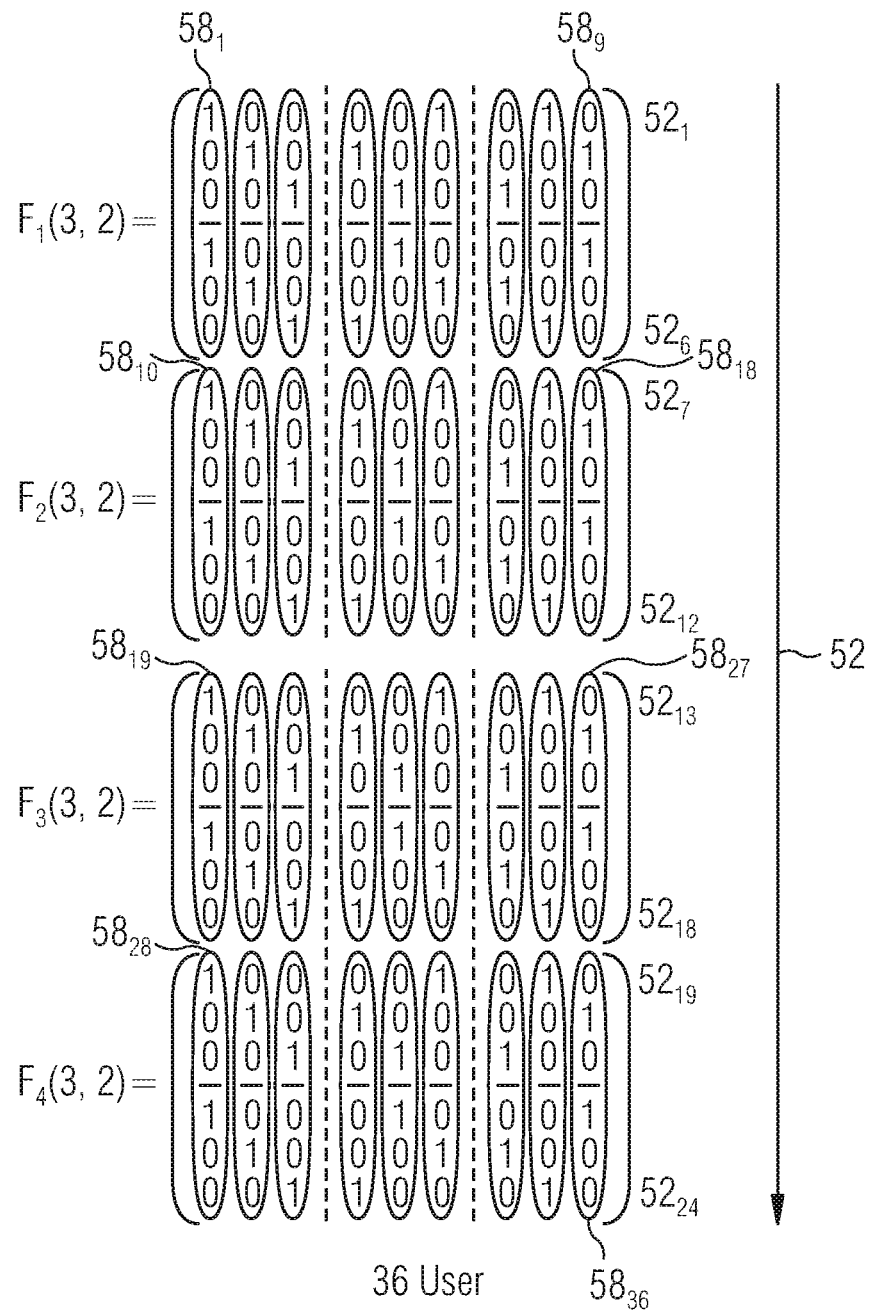
FIG. 7b shows a concept according to which four matrices are used so as to allocate or associate the same resources as in FIG. 7a to a different number of subsets, according to an embodiment.

When referring now to FIGS. 7a and 7b, there is schematically illustrated the flexibility of using Euler-squares according to embodiments described herein. By way of example, 24 resources $52_1$ to $52_{24}$ may be used in the network, e.g., the network 100 or 150.

So as to allow an overload in the network, i.e., more users, layers, messages, or data streams when compared to the number of resources, Euler-squares may be used. According to FIG. 7a, a first matrix $F_1$(4, 3) and a second matrix $F_2$(4, 3) are used for generating subsets $58_1$ to $58_{16}$, $58_{17}$ to $58_{33}$ respectively, whilst allocating or associating resources $52_1$ to $52_{12}$, $52_{13}$ to $52_{24}$ respectively to the subsets $58_1$ to $58_{33}$. Thus, a double number of resources is allocated to a double number of subsets when compared to FIG. 6b. This allows for obtaining a number of 32 subsets so as to serve 32 users, layers or the like. As described in connection with FIG. 6c, a different number may be obtained.

In FIG. 7b four matrices $F_1$(3, 2), $F_2$(3, 2), $F_3$(3, 2) and $F_4$(3, 2) are used so as to allocate or associate the same resources $52_1$ to $52_{24}$ to a number of 36 subsets as each of the matrices $F_1$(3, 2) to $F_4$(3, 2) yields in a number of nine subsets as described in connection with FIG. 6a.

Applying the four matrices $F_1$(3, 2) to $F_4$(3, 2) to the resources $52_1$ to $52_{24}$ allows thus for obtaining a number of 36 subsets so as to serve a number of 36 users, layers or the like. Thus, when compared to FIG. 7a, a higher number of subsets may be obtained so as to serve a higher number of users by utilizing a same number of resources 52.

Using Euler-square matrices allows for a high flexibility. Based on a load in the network, an overload respectively, the allocation of resources 52 to the subsets 58 may be changed, varied or adapted so as to allow of the users to be served whilst, at the same time, allowing for a high communication quality due to the high spreading. This enables a reliable communication in the network.

In other words, FIGS. 7a and 7b illustrate two different configurations for a group of 24 resource elements. Both configurations use NOMA whereas both configurations have different spreading properties (configuration according to FIG. 7a has larger spreading width and has higher diversity gain, whereas configuration according to FIG. 7b supports a larger number of users.

Each part n=1, n=2, n=3 and/or n=4 may be subjected or associated with a different precoder ID. For example, each precoder may correspond to a beam former allowing for a hybrid configuration in conjunction with spatial precoding. Spatial multiplexing may lead to interference between different areas being multiplexed. By use of subsets being orthogonal with respect to other precoders, interference may be reduced between the different spatial regions.

Although embodiments described herein refer to Euler-square matrices of form F(3,2) and F(4,3) different forms may be used, for example, depending on the number of resources to be shared and/or on the number of subsets to be used. Although embodiments are described as using one single Euler-square-matrix (FIGS. 6a, 6b and 6c), two Euler-square matrices (FIG. 7a) or four Euler-square matrices (FIG. 7b) for allocating resources to subsets, according to embodiments, a different number such as 3, 5 or more may be used.

The controller may select the number of resources allocated to the subsets to be reduced. For example, the resources are needed to be allocated into different subsets, used otherwise or become unavailable for any reason.

This may be obtained by using a different Euler Square matrix for determining the subsets of resource elements, e.g., from the Euler-square matrix F(4,3) illustrated in FIG. 6b to the Euler-square matrix (F3,2) illustrated in FIG. 6a, or from the schedule of FIG. 7b to schedule of FIG. 7a. Alternatively, at the same time, the same number of users may be aimed to be mapped but on the lower number of resources, i.e., n·k' instead of on n·k resource elements or resource blocks.

Figure 7C:
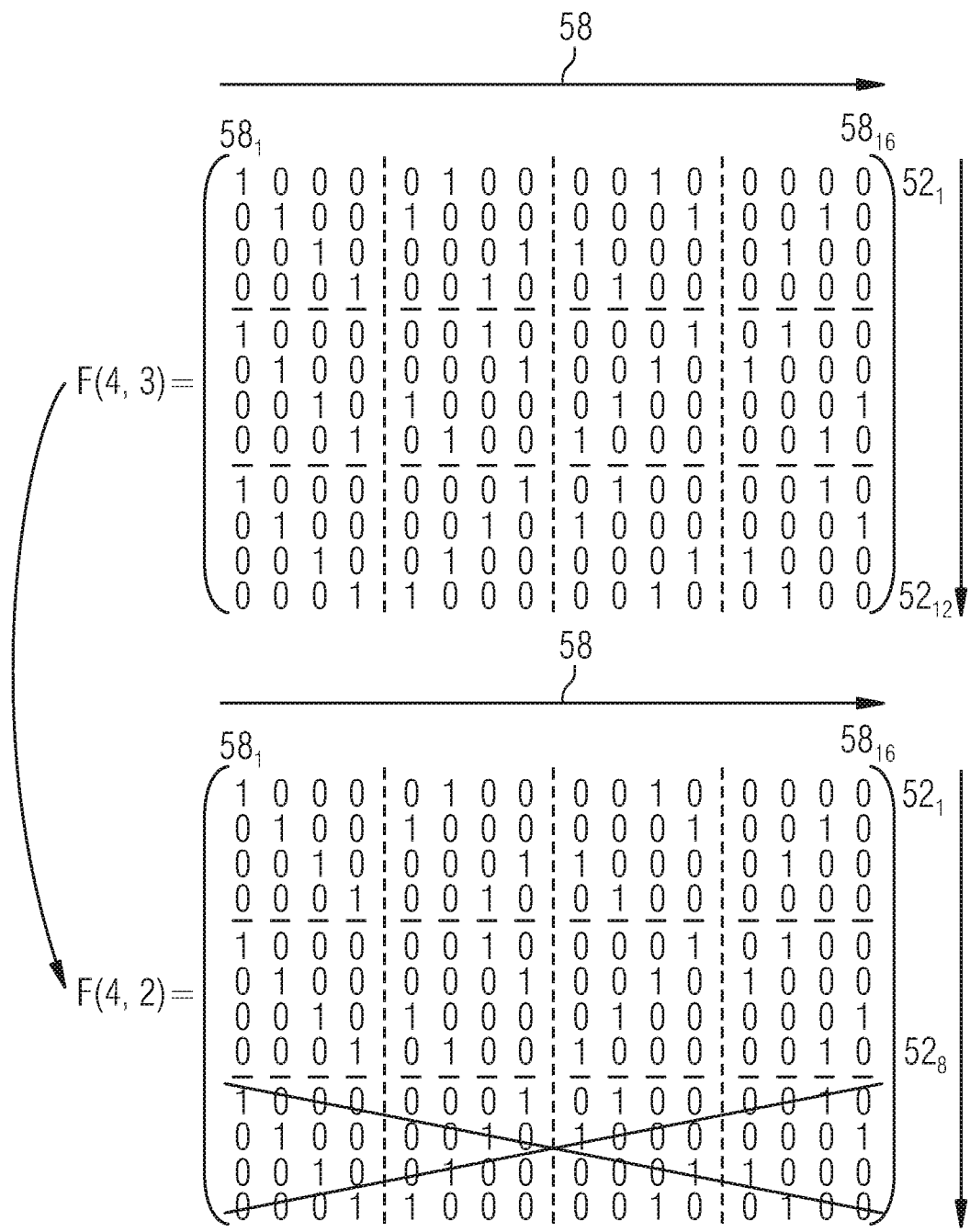
FIG. 7c a concept for reducing the number of resources mapped to subsets whilst maintaining the number of subsets.

Serving a same number of users using a reduced set of resources may be obtained as illustrated in FIG. 7c, in which the aforementioned knowledge may be exploited according to which the existence of the Euler Square of index n, k implies that the Euler Square of index n, k' also exists, wherein k'<k. Thus, effectively, a construction F(n, k') (where k'<k) exists, whenever a construction F(n, k) exists. In FIG. 7c this is illustrated for the Euler-square matrix F(4,3) of FIG. 7b being reduced to the Euler-square matrix F(4,2), i.e., k=3 and k'=2.

F(n, k') may be obtained from F(n, k) by simply deleting k-k' (3-2=1) blocks of n (n=4) rows each from F(n, k), for example, the last 4 rows such that instead of 12 resources 8 resources are mapped. Any other row or block thereof may be deleted. Reduction of the number of rows allows for maintaining the number of subsets 58 with reduced resources 52. A base station according to an embodiment may be configured for allocating the resources (first number thereof) to the second number of subsets during a first instance of time and for allocating a second, reduced number of resources to the same number of subsets during a second instance of time, wherein the first instance may be prior to the second instance or after. By reducing the number of resources, the benefits of the Euler-square concept, i.e., the relationship between the resource subsets may be maintained, in particular when deleting blocks of rows.

Figure 8:
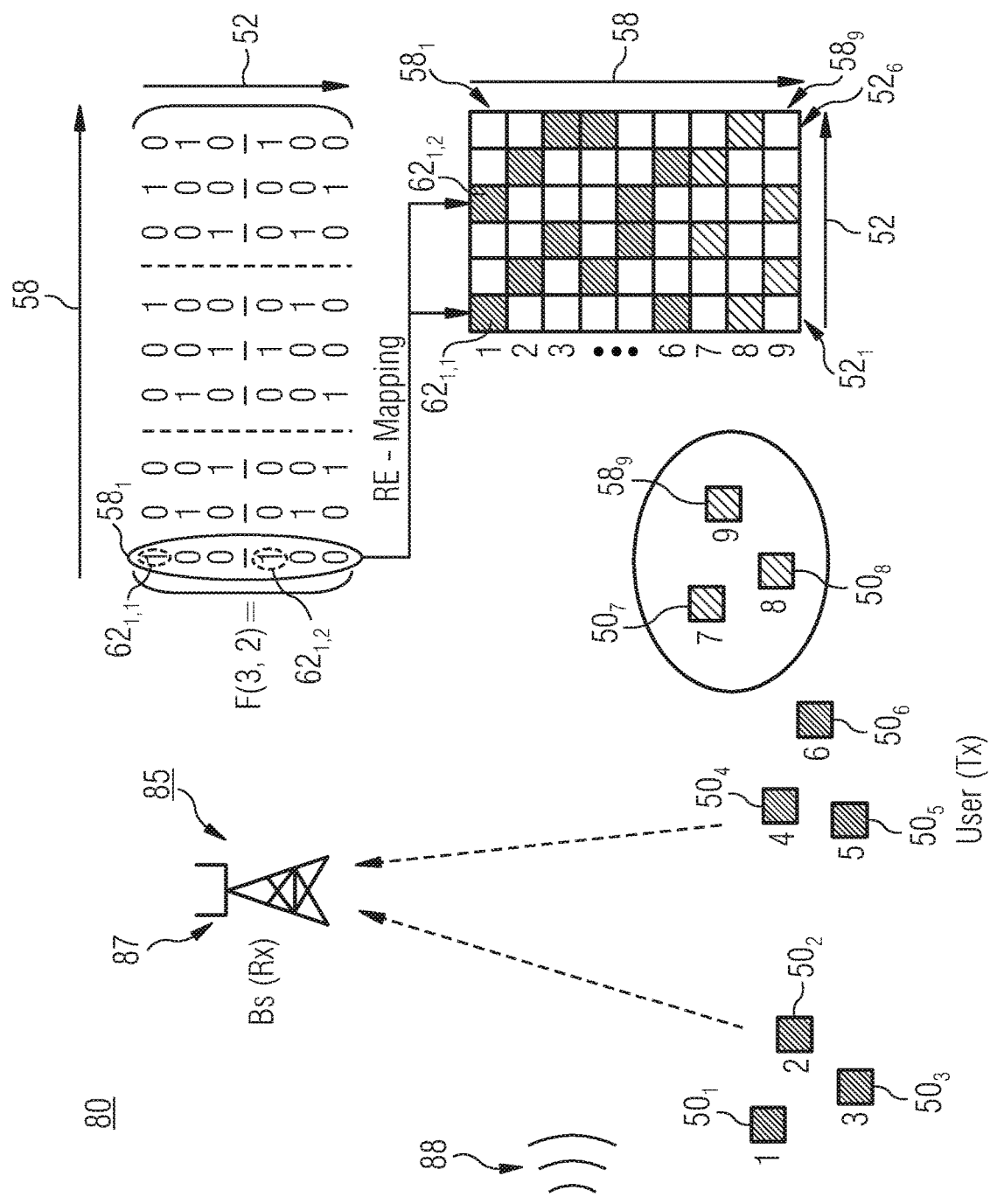
FIG. 8 shows a schematic block diagram of a wireless network according to an embodiment.

FIG. 8 shows a schematic block diagram of a wireless network 80 according to an embodiment. The wireless network 80 comprises a base station 85 according to an embodiment. The base station 85 is configured for operating at least a cell of a wireless network such that that the wireless network utilizes a first number of resources for serving communicating UEs $50_1$ to $50_9$. The base station 85 comprises a wireless interface 87 for communicating in the wireless network 80. The base station 85 may be, for example, one of the base stations gNB of FIG. 1 and/or one of the transceivers 156 and 158. The base station 85 is configured for operating the wireless network 80 so as to support communication of the UEs $50_1$ to $50_9$ by use of at least one subset $58_1$ to $58_9$ of the resources $52_1$ to $52_6$. The number of subsets 58 is larger when compared to the number of resources and is obtained based on a mapping of the number of resources 52 into the number of subsets 58 using an Euler-square mapping.

The base station 85 may be configured for dynamically adapting transmission properties. For example, whilst managing six resource elements $52_1$ to $52_6$, as long as at most six users, e.g., user equipments $50_1$ to $50_6$ or different user equipment are present in the wireless network cell, standard communication may be performed according to which each of the UEs $50_1$ to $50_6$ uses one associated or allocated resource.

At a situation in which one, more or all of additional UEs $50_7$ to $50_9$ become active in the wireless network 80, the base station may divide the resources $52_1$ to $52_6$ into the subsets $58_1$ to $58_9$ so as to serve all of the UEs $50_1$ to $50_9$. For example, if only one of the UEs $50_7$, $50_9$ or $50_9$ becomes active in the wireless network 80, the nine subsets may be generated whilst only seven of them are used. Accordingly, if two of the three additional UEs $50_7$ to $50_9$ become active, one of the subsets $58_1$ to $58_9$ may remain unused. The base station 85 may be configured for monitoring a number of communicating UEs served by the base station. The base station 85 may use orthogonal resources when the number of UEs is below a number threshold, for example, then number of resources available, wherein also different thresholds may be used, for example, if one or more resources are reserved for special purposes or the like. The base station 85 may further be configured for serving the UE so as to use the subsets when the number of UEs is at least the number threshold or above the threshold. I.e., when used, the base station 85 may switch from orthogonal communication to non-orthogonal communication.

Alternatively or in addition, the base station 85 may, whilst monitoring the number of communicating UEs served by the base station 85, determine, that the number of subsets is probably insufficient. For example, when referring to the examples given in connection with FIGS. 7a and 7b, starting from the example, in FIG. 7a, a $33^{rd}$ user may become active in the wireless network. The base station may be configured for adapting the number of subsets 58 in view of a count thereof and/or in view of a number of resources contained in the subsets as described in connection with FIG. 6c so as to obtain a second version of the second plurality of subsets 58, i.e., a higher number thereof. In different terms, the base station 85 may adapt this scheme according to which the resources are allocated into the subsets based on the number of UEs to be served. When the number of UEs decreases, the base station 85 may be configured for reducing the number of subsets, probably whilst increasing a number of resources used within each subset 85.

Whilst the examples given herein refer to the uplink, i.e., resources used by the UEs for transmitting their signals, data streams or messages, a same or comparable scheme may be used for the downlink purpose in which the base station uses different resources to communicate with the UEs. One or more of the UEs $50_1$ to $50_9$ may be configured for receiving a signal 88 containing a selection information. For example, the signal 88 may be transmitted from the base station 85 or from a different network controller, for example, of a controller of the core network 102 illustrated in FIG. 1.

The signal 88 may be transmitter wirelessly, wherein the selection information contained therein may indicate the allocated set of resources or a property thereof such as a bandwidth in terms of subband, size and indices. In particular, the allocated set of resources subjected to the overload may itself be a portion of the overall resources allocated by the base station. Further, the selection information may indicate a number, structure or further details of the subsets 58. For example, the selection information may indicate a subset, i.e., parts, of the group of subsets $58_1$ to $58_9$ generated by the base station 85.

For example, the selection information may indicate a preselection indicating that the receiving or addressed UE $50_1$ to $50_9$ is requested to select its subset out of the indicated preselection. I.e., the selection information may indicate a range of subsets to be used for communication for a grant-free access. For example, an identifier of the subsets may be transmitted.

The selection information may reduce the allowed range of subsets so far that specific subsets to be used may be indicated, for example, when the selection information only contains information about one single subset. This may be referred to as a grant-based access scheduled by the controller or base station. The selection information may indicate a specific subset, e.g., by using its identifier, allocated to the UE for a grant-based access. I.e., the selection information may allow for a schedule of the subsets.

Different UEs $50_1$ to $50_9$ may receive different selection information allowing to reduce a probability of a collision, in particular, in a configuration according to which the UE $50_1$ to $50_9$ is configured to use or utilize one or more subsets $58_1$ to $58_9$ in a grant-free manner. I.e., the selection information may be transmitted by the controller/base station UE-specific, group based for a group of UEs and/or network-based such as based on a cell-id of the wireless network cell.

Based on the base station transmitting the information on the specific channels, the UE may be configured for receiving the selection information indicating the allocated first set of resources, indicating the assignment of the specific Euler square matrix (F(n, k)) and/or the indicating the range of subsets to be used for communication over a broadcast control channel such as a Physical Broadcast Channel (PBCH) or the like, i.e., the controller may transmit the signal 88 using such a channel, wherein other channels may also be used. The UE may alternatively or in addition be configured for receiving the selection information indicating the specific subset allocated to the UE over a user specific channel such as a Physical Downlink Control Channel (PDCCH), wherein other channels may also be used.

Alternatively, an absence of the signal 88 may also be understood as a selection information, for when a UE of the UE $50_1$ to $50_9$ is aware of the present configuration or setting of the subsets 58, it may select a needed number thereof in a grant-free manner. Whilst not being restricted due to reception of the selection information with the signal 88, the UE may select the subset unrestrictedly. This does not exclude that the selection information may include a kind of codebook entry indicating the subset to be used and/or the scheme according to which the subset is obtained, for example, an index of the subset and the parameters n, k used in the matrix F. For example, the selection information may indicated an assignment of a specific Euler square matrix (F(n, k)) to be applied to the first set of resources for example by identifying the resources with a subband index. It is noted that the embodiments described herein are not limited to the specific embodiment of the matrix F(n, k). In contrast, different ways of generating an Euler-square matrix as described herein, may be used.

When the base station 85 has changed the scheme according to which the subsets are generated, the UE may also select a different subset such that the controller 56 is configured for selecting the at least one subset from a first version (e.g., F(3,2)) of the predefined subsets 58 during a first instance of time and from a second version (e.g., F(4,3)) of the predefined subsets during a second instance of time, wherein the first version and the second version differ in view of a count of the second number of predefined subsets and/or in view of a number of resources contained in the subset.

In other words, a particular application scenario is illustrated in FIG. 8, where multiple users share the same resources by using sparse spreading signatures/codes. In contrast to LDS/SCMA the mapping of the individual users to the specific resources may be determined by the F-matrix as described herein, for example, in connection with FIGS. 6a, 6b, 6c, 7a and/or 7b. FIG. 8 thus shows a non-orthogonal multiple access scenario using sparse signatures. All users 50 may be multiplexed over six resources and the signatures are constructed as described herein. The base-station only needs to broadcast the parameter of the F-matrix (n=3 and k=2) to the user. Together with an individual ID, each user can generate a unique spreading sequence, taking the corresponding row of the F-matrix.

A method for operating a UE according to an embodiment comprises communicating in the wireless network and selecting, for communicating in the wireless network, from a second number of predefined subsets of the first number of resources, at least one subset. The second number is larger than the first number. The second number of predefined subsets is based on a mapping of the first number of resources into the second number of subsets using an Euler-square mapping.

A method for operating a base station according to an embodiment comprises communicating in the wireless network with the base station. The method comprises operating the wireless network so as to support communication of the UEs by use of at least one subset from a second number of predefined subsets of the first number of resources. The second number is larger than the first number and the second number of predefined subsets is based on a mapping of the first number of resources into a second number of subsets using a Euler-square mapping.

Further embodiments refer to a computer program product comprising instructions, which when the program is executed by a computer, cause the computer to carry out one of the embodiments described herein.

The structure according to which the resource elements are allocated to subsets may be determined by a central controller of the network, e.g., a base station, wherein the base station may use a static or variable scheme. The system (base station) may determine or define, which sequences/subsets are allowed, for example, by defining the specific matrix or matrices to be used for deriving the subsets, which includes the possibility to reserve or block some subsets for special purposes such as priority services or the like. Thereby, the structure of the one or more F-matrices may be defined. Those F-matrices form a rule or a provision according to which users (layers) are allowed to access the underlying resource grid, the resources or resource blocks respectively. Some of those resources may be generated and/or used as orthogonal as will be describe in connection with FIG. 6c and FIGS. 9a and 9b.

A further aspect of the embodiments described herein is to allocated or associated different subsets to different precoders as described in connection with FIG. 6c. For example a specific number, e.g., 4 in FIG. 6c or a different number of 1, 2, 3 or more than 5 in other embodiments, are associated with a number of exemplarily four precoders or a different number of 1, 2, 3 or more than 5 in other embodiments, wherein the numbers of precoders and the number of subsets may correspond to each other but may also be different. Within one precoder, the subsets as illustrated in FIG. 6c are orthogonal with respect to each other, thereby allowing for an orthogonal communication, although the entirety of subsets may be non-orthogonal.

FIG. 9a shows a schematic illustration of a scenario in which, of example, six resources operated by the base station are mapped using an Euler-square mapping. FIG. 9b shows a schematic representation of the same scenario, wherein according to FIG. 9a an orthogonal communication is used, wherein, according to FIG. 9b, also non-orthogonal communication is allowed. For both, the orthogonal communication according to FIG. 9a and the non-orthogonal communication according to 9b, the Euler-square mapping according to embodiments may be used. During an example first instance of time [$t_1$; $t_2$] a scenario of three users may be served by the first three subsets of the matrix F(3, 2) being linearly independent from each other and therefore allow for an orthogonal communication. In a different instance of time [$t_3$; $t_4$] which may be prior or after the first instance of time, a number of up to six users may be supported by splitting the subsets $58_1$ to $58_3$ of the first time instance to subsets $58_1$ to $58_6$, each subset comprising one single resource element indicated by the single "1" in each subset 58.

During a different instance of time [$t_5$; $t_6$] which may be prior or after the first and/or second instance of time, e.g., nine users are active in the network. Serving nine users with six resource elements at the same time by orthogonally serving them without amending the resource elements may be difficult or impossible.

When referring now to FIG. 9b, during the second instance of time, additional three subsets may be activated so as to serve the additional three users. Although being marked as inactive during the first instance of time, each user may use two or more subsets without any limitation.

During the third instance of time, all nine subsets $58_1$ to $58_9$ may be used by the nine users. In other words, embodiments describe a structured code design for NOMA with several attractive properties lending itself for practical implementation, in particular:

It describes a code construction yielding regular layer/user-resource mapping based on Euler squares, where each layer occupies a fixed number of resources, and each resource is used by a fixed number of layers. The construction is flexible in the sense that it can be explicitly described for a wide number of combinations of system parameters, i.e. number of users/layers, number of resource elements, the number of resources occupied by each layer, the number of layers sharing the same resource and the overloading factor;

The construction allows to trade QoS requirements such as latency, reliability and spectral efficiency in a flexible manner, making it appropriate for both unscheduled transmissions targeting mMTC scenarios, as well as scheduled transmission targeting eMBB and URLLC scenarios.

The sparse regular construction gives signatures with small density, which support decoding algorithms with low computational complexity;

There are significant savings in storage requirements as the generation of the code signatures needs only the storage of cyclic permutations (more details provided in the following description);

The construction can be combined with other code-domain NOMA, both with sparse spreading (such as SCMA and LDS), and dense spreading;

The construction naturally incorporates user transmission with random activation, making it also amenable for a use as a grant-free scheme for non-orthogonal random access.

When compared to known concepts, embodiments facilitate the application of NOMA in a wireless communication network by proving an effective method/concept to construct and distribute (sparse) resource allocation patterns (sequences/structured codes).

In other words, FIGS. 9a and 9b show an example resource allocation and adaptive network configuration.

This invention facilitates the application of NOMA in a wireless communication network by providing an effective method to construct and distribute (sparse) resource allocation pattern (sequences/structured codes). The core idea is that the resource allocation can be constructed based on specific rules—and only a set of parameters need to be signaled between different nodes in the network. In contrast, LDS/SCMA—based schemes [ref] employing sparse spreading as well—but make use of a pre-defined "codebook" (i.e. a pre-defined set of sequences, common to all nodes within the network). If two nodes want to communicate, both nodes (sender and receiver) need to share the indices of the specific sequence(s) to be used. Due to the limited dimension (size) of the codebooks and it's pre-defined structure it is not possible to adaptively switch between different configurations (e.g. overload factors).

Example of an SCMA network uses a codebook which allows 6 users to share the same 4 resources at the same time (which gives an overload factor of 6/4→1.5). There are 6 users in the network, each having an unique sequence id (i.e. codebook entry). Now, the number of users increases, i.e. there are two users joining the network but spare resource are unavailable. Thus it needs a new codebook which allows e.g., an overload of 8/4→2) and this new codebook need to be shared between all users (including the 6 other users). This results in signaling overhead. Our invention provides a framework how these sequences can be constructed more flexible, not a codebook entry is shared but a construction method of the sequence, which can be extended due to the regular structure of the construction.

Embodiments provide for a structured, flexible code design for NOMA, based on a regular layer/user resource mapping, and supporting a wide number of combinations of system parameters. In particular, in connection with the resource element, the following system model may be considered. It may be assumed that a general form of a resource grid where resource elements (i.e., channel users) are spread in time (OFDM symbols), frequency (subcarrier) and space (antennas, different beams thereof respectively) as shown in FIG. 10 illustrating an example diagram for illustrating the concept of a resource according to embodiments.

Figure 10:
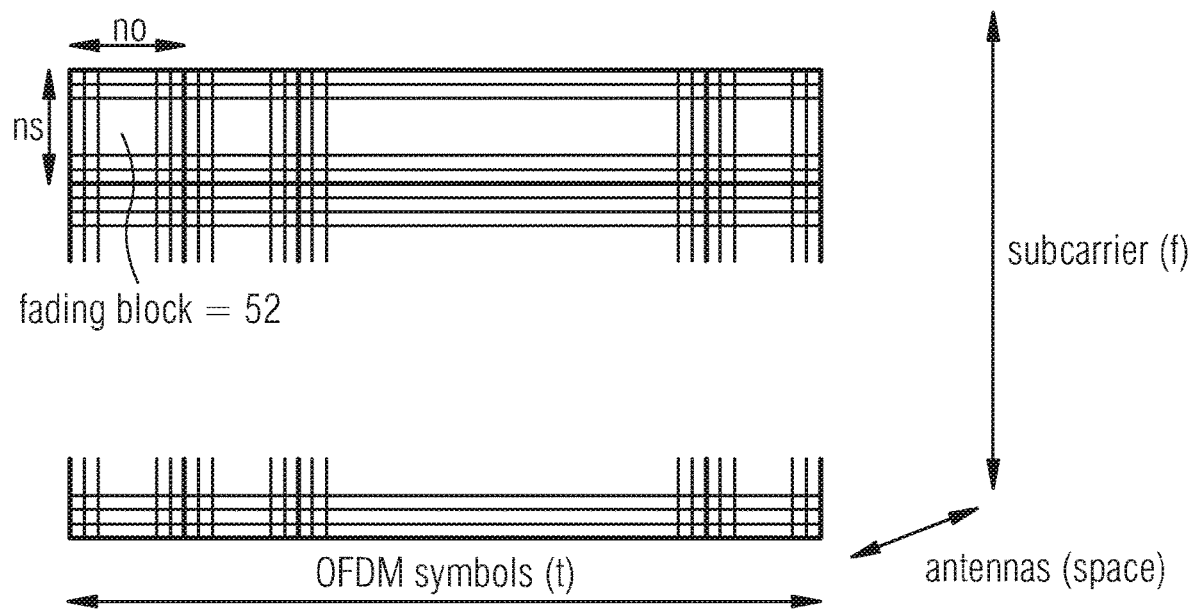
FIG. 10 shows an example diagram for illustrating the concept of a resource according to an embodiment.

A general form of a resource grid may be assumed where resource elements (i.e. channel uses) are spread in time, frequency and space (see FIG. 10). The resource elements are organized in fading blocks of length nc (coherence length) across which they are assumed to experience approximately the same (or similar) wireless channel conditions (i.e. realizations). For a frequency-flat narrowband channel, nc is the number of channel uses in time over which the channel stays constant (coherence time); for a frequencyselective channel and under the assumption that orthogonal frequency division multiplexing (OFDM) is used, nc is the number of subcarriers over which the channel stays constant (coherence bandwidth). More generally, nc can be interpreted as the number of time-frequency slots over which the channel does not change. The fading blocks are further divided in resource blocks (RBs) as, e.g. in an OFDM-based system, where a RB consists of no OFDM symbols, each one spanning ns consecutive subcarriers.

FIG. 10 thus shows an orthogonal resource frame—including fading blocks (FB), wherein each FB contains nc=ns·no resource elements (RE). As described previously, based on a possible flexible granulation of the wireless network, the term resource element in connection with the embodiments described herein may be flexible. According to an embodiment, a fading block is equal to a resource element 52. In an example scenario, the layers share the resource elements across a set of orthogonal resource blocks Q (a resource frame), in a non-orthogonal fashion. Thereby, it is assumed that each RB is a subset of a FB, i.e., that all resource elements within one RB experience (approximately) the same channel conditions, while the channel conditions may, in general, vary across different RBs. In addition, it may be assumed that a layer could be a user in the uplink of a communication channel, or a multiplexed signal in the downlink. In general, individual users are allowed to multiplex signal on the same resource elements, i.e., to use several layers simultaneously. In this context, different antenna-dimensions may additionally be considered as resource (space). A resource frame consisting of n FB orthogonal fading blocks (FBs), e.g., as in OFDM based systems, is dedicated for the multiple access procedure, i.e., are shared between the layers. A layer may be a user in the uplink of a communication channel, or a multiplexed signal in the downlink. In general, individual users may be allowed to multiplex signals on the same resource elements, i.e., to use several layers simultaneously.

In the context of the time-frequency grid illustrated in FIG. 10, the transmit signals of the individual users (layers) may be encoded for non-orthogonal transmission in the following way.

When active, user (layer) j divides the transmit signal vector $x_j$ in Q subvectors, where the q-th subvector $x_j^q$ is mapped on the resources in FB q. Without loss of generality, one can assume that the block lengths are of equal length nc (the size of the fading blocks). Due to the time-frequency symmetry within the fading block, different rearrangements are possible. As a special case, the construction where each active user (layer) transmits over exactly one subcarrier within each FB may be highlighted. In that case, the received signal matrix $Y^{(q)}$ over the fading block q reads $$Y^{(q)}=F^{(q)}\mathrm{diag}(\lambda)\mathrm{diag}(h^{(q)})X^{(q)}+W^{(q)}, q=1,\ldots,Q$$

where, in this particular case, the j-th row of $X^{(q)}$ is the subvector $x_j^q$ which is transmitted over the no time slots (e.g. OFDM symbols). The construction from the Euler square of index n; k, as described is particularly appropriate, with the parameters being Q=k and ns=n and J=n2. For the matrix in the example provided in FIG. 6a and FIG. 6b this would mean that J=9 users (layers) are multiplexed over Q=2 fading blocks, where the fading block spans over ns=3 subcarriers and no time slots. Alternatively, embodiments may also be implemented so as to define ns being divided in 3 blocks of adjacent subcarriers.

As described before, the proposed method allows to assign individual UEs to access specific resources in a coordinated fashion. An example on how the network can change the configuration is given in the following. Assuming a wireless communication system where multiple users share the wireless resources (time, frequency, space). In an OFDMA-based system, the available resources are divided into (orthogonal) RBs (resource blocks), whereas each RB comprises several resource elements. In an LTE-based system, the number of supported user is limited by the number of the smallest resource instance which can be scheduled (in LTE this corresponds to the RB). If the number of users increase (exceeding the number of available orthogonal resources), the network/base-station can "switch" to orthogonal MA (NOMA) In order to allow higher number of users. A NOMA transmission can exploit sparse-spreading sequences to transmit the data, e.g. LDS/SCMA. Generally, the group resources which are shared by the same users can be considered as group or block. An example is depicted in FIG. 9a and FIG. 9b, where a group of 6 resources are shared 3/6/9 users with different MA strategies.

The overall performance of NOMA in general, and signature-domain NOMA in particular, should be addressed in conjunction with appropriate forward error correction (FEC) coding (channel coding) and interleaving. The signature-based multiplexing may be treated as independent from the particular FEC scheme. There are, however, some system design issues arising from the system/channel model that should be addressed when implementing signature-domain multiplexing in conjunction with FEC. In particular, two important system design parameters are to be addressed The number of diversity branches L over which the transmit signals are spread: in single-antenna transmissions this is basically the number of fading blocks, L=Q. The assumption here is that the different resource blocks experience more or less independent channel conditions. In the multiple antenna setup with sufficiently spaced antennas this is the number of resource blocks Q multiplied with the number of transmit antennas $n_t$, $L=Qn_t$;

The channel coherence length nc: this is the number of resource elements over which the channel remains (approximately) the same. When resource elements are grouped in resource blocks (as in our example), the size of the resource block does not exceed the coherence length, $n_{RE}$=ns·nc.

There are different ways in which one can combine signature-domain NOMA with FEC, depending on the system design parameters, and the targeted communication requirements in terms of number of users to be accommodated over the shared resources, the respective transmission rates, reliability (block-error rates) and latency requirements. For example, one way to take advantage of diversity is to use a form of repetition over the available diversity branches, as e.g. in some Low Density Signature (LDS)-based NOMA schemes. An alternative (somewhat different in spirit) are the constructions based on high-dimensional constellations, as e.g in SCMA, which are based on signal-space diversity concepts. The question is, however, if similar benefits may be gained by simply transmitting different portions of the coded block over different diversity branches. In practice this would mean that information bits are coded and interleaved, and then the first chunk of the coded block is transmitted on the first diversity branch (resource block), the second one on the second diversity branch and so on. Given a certain mobility scenario, and for a fixed code-length, the performance of each of the approaches depends critically on the number of diversity branches. In addition, when targeting a massive access scenario with (sporadic) short packet transmissions, i.e. a fixed short code-length, the number of diversity branches are traded with the number of symbols sent over the same fading block for optimal performance. The reason for this is that, when keeping the code-length fixed, by employing more diversity branches, less resource elements experiencing the same channel conditions are left for data transmission (including channel estimation) effectively deteriorating the performance.

When performing receiver configurations, the matrix F which maps the transmit signals to the shared resource elements, give raise to a bipartite graph, where resource node i and layer node j are connected if and only if $(F)_{i,j}=1$. Joint decoding based on MPA. The sparse regular construction give matrices with small density which support decoding algorithms with computational complexity. Due to the generic nature of the embodiments described herein, the embodiments may be configured to multiple different NOMA schemes, by appropriately selecting the respective parameter for generating the matrix F. There may be significant savings in storage requirements as the generation of an Euler square of an index p; p-1, for example, only needs to store two cyclic permutations of length p and p-1, respectively. For Euler square with index respectively and for Euler square of index $p^r$; $p^r-1$ (where p is a non-even prime) it is sufficient to store at most $p^2/2$ permutations. Embodiments provide for the numerous benefits and/advantages, including:

- a promising multiple access and random access technology for a 5G standard;
- a method to improve the throughput of a wireless network and enable operation in UL, DL, D2D, or M2M transmissions;
- a method to transmit short packets with a small overhead;
- a method to accommodate a large number of system devices;
- a method to decrease latency in a random access scenarios;
- a method to provide non-coherent data transmission (i.e. without instantaneous transmit/receive channel knowledge);
- a low-complexity receiver implementation based on message passing;
- an EXIT chart-based evaluation methodology.

Advantages derived from this disclosure may be significant due to the large amount of base stations and terminals in the network.

Embodiments may be used in applications of all kinds of wireless networks, such as current and upcoming network specifications, where signals are multiplexed on shared resources. Embodiments thus refer, in general, to signature domain multiple access.

The embodiments described herein allow for a flexible and scalable structuring of signatures according to which users spread their information. As described in connection with FIGS. 6a, 6b, 6c, 7a and 7b, same sequences and a same scheme for generating the same may be used for different situations such that embodiments described herein refer to the signature design as well as to the flexibility.

Although some aspects of the described concept have been described in the context of an apparatus, it is clear that these aspects also represent a description of the corresponding method, where a block or a device corresponds to a method step or a feature of a method step. Analogously, aspects described in the context of a method step also represent a description of a corresponding block or item or feature of a corresponding apparatus.

Figure 11:
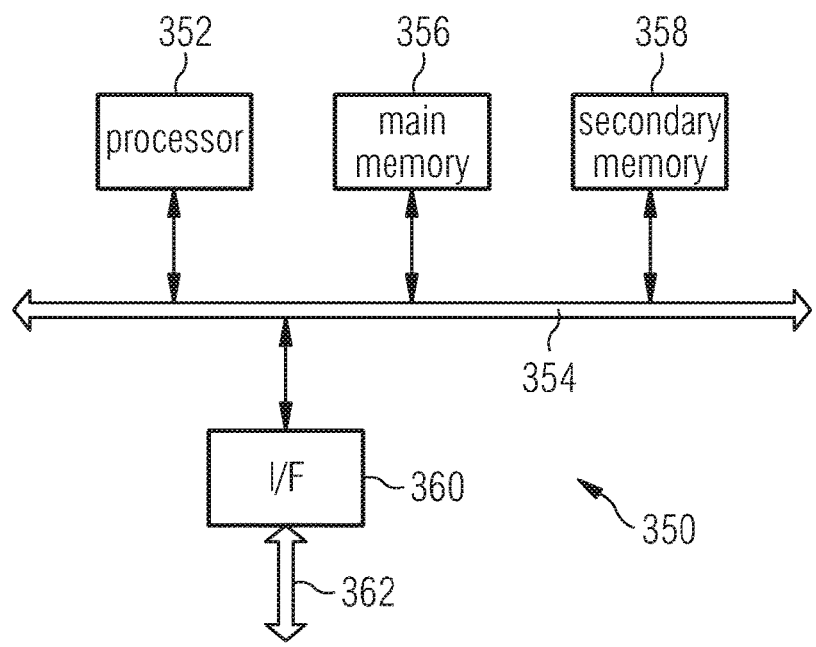
FIG. 11 illustrates an example of a computer system on which units or modules as well as the steps of the methods described in accordance with the inventive approach may execute.

Various elements and features of the present invention may be implemented in hardware using analog and/or digital circuits, in software, through the execution of instructions by one or more general purpose or special-purpose processors, or as a combination of hardware and software. For example, embodiments of the present invention may be implemented in the environment of a computer system or another processing system. FIG. 11 illustrates an example of a computer system 350. The units or modules as well as the steps of the methods performed by these units may execute on one or more computer systems 350. The computer system 350 includes one or more processors 352, like a special purpose or a general purpose digital signal processor. The processor 352 is connected to a communication infrastructure 354, like a bus or a network. The computer system 350 includes a main memory 356, e.g., a random access memory (RAM), and a secondary memory 358, e.g., a hard disk drive and/or a removable storage drive. The secondary memory 358 may allow computer programs or other instructions to be loaded into the computer system 350. The computer system 350 may further include a communications interface 360 to allow software and data to be transferred between computer system 350 and external devices. The communication may be in the from electronic, electromagnetic, optical, or other signals capable of being handled by a communications interface. The communication may use a wire or a cable, fiber optics, a phone line, a cellular phone link, an RF link and other communications channels 362.

The terms "computer program medium" and "computer readable medium" are used to generally refer to tangible storage media such as removable storage units or a hard disk installed in a hard disk drive. These computer program products are means for providing software to the computer system 350. The computer programs, also referred to as computer control logic, are stored in main memory 356 and/or secondary memory 358. Computer programs may also be received via the communications interface 360. The computer program, when executed, enables the computer system 350 to implement the present invention. In particular, the computer program, when executed, enables processor 352 to implement the processes of the present invention, such as any of the methods described herein. Accordingly, such a computer program may represent a controller of the computer system 350. Where the disclosure is implemented using software, the software may be stored in a computer program product and loaded into computer system 350 using a removable storage drive, an interface, like communications interface 360.

The implementation in hardware or in software may be performed using a digital storage medium, for example cloud storage, a floppy disk, a DVD, a Blue-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention may be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier. In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. A further embodiment of the inventive method is, therefore, a data stream or a sequence of signals representing the computer program for performing one of the methods described herein. The data stream or the sequence of signals may for example be configured to be transferred via a data communication connection, for example via the Internet. A further embodiment comprises a processing means, for example a computer, or a programmable logic device, configured to or adapted to perform one of the methods described herein. A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are performed by any hardware apparatus.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

REFERENCES

[1] R. Hoshyar, F. P. Wathan, and R. Tafazolli, "Novel low-density signature for synchronous cdma systems over awgn channel," IEEE Transactions on Signal Processing, vol. 56, no. 4, pp. 1616-1626, April 2008.

[2] H. Nikopour and H. Baligh, "Sparse code multiple access," in 2013 IEEE 24th Annual International Symposium on Personal, Indoor, and Mobile Radio Communications (PIMRC), September 2013, pp. 332-336.

[3] M. Taherzadeh, H. Nikopour, A. Bayesteh, and H. Baligh, "Scma codebook design," in 2014 IEEE 80th Vehicular Technology Conference (VTC2014-Fall), September 2014, pp. 1-5.

[4] M. Yoshida and T. Tanaka, "Analysis of sparsely-spread cdma via statistical mechanics," in 2006 IEEE International Symposium on Information Theory, July 2006, pp. 2378-2382.

[5] S. Verdu and S. Shamai, "Spectral efficiency of cdma with random spreading," IEEE Transactions on Information Theory, vol. 45, no. 2, pp. 622-640, March 1999.

[6] O. Shental, B. M. Zaidel, and S. S. Shitz, "Low-density code-domain noma: Better be regular," in 2017 IEEE International Symposium on Information Theory (ISIT), June 2017, pp. 2628-2632.

[7] H. F. MacNeish, "Euler squares," Annals of Mathematics, vol. 23, no. 3, pp. 221-227, 1922. [Online]. Available: http://www.jstor.org/stable/1967920

The invention claimed is:

1. A user equipment, UE, for operating in a wireless network, wherein the wireless network utilizes a first number of resources for serving communicating UEs, the UE comprising:
   a wireless interface for communicating in the wireless network;
   a controller configured for selecting, for communicating in the wireless network, from a second number of predefined subsets of the first number of resources, at least one subset;
   wherein the second number is larger than the first number and wherein the second number of predefined subsets is based on a mapping of the first number of resources into the second number of subsets.

2. The UE of claim 1, wherein the second number of predefined subsets is based on a mapping of the first number of resources into the second number of subsets using an Euler square-based mapping.

3. The UE of claim 1, wherein the Euler square mapping is representable as a matrix (F(n, k)) comprising a structure F(n, k), in which n·k is the first number of resources and in which $n^2$ is the second number of subsets, wherein the matrix (F(n, k)) is structured so as to comprise a number of n entries indicating a use of resource elements in each row and so as to comprise number of k entries indicating a use of resource elements in each column.

4. The UE of claim 3, wherein the entries are arranged in the matrix (F(n, k)) so as to comprise a maximum spreading.

5. The UE of claim 1, wherein resources of a first subset of the second number of predefined subsets is non-orthogonal with respect to a second subset of the second number of predefined subsets.

6. The UE of claim 1, wherein the UE is configured for receiving, from a network controller a selection information, wherein the selection information indicates a subset of the second number of subsets; wherein the controller is configured for selecting the at least one subset in accordance with the selection information.

7. The UE of claim 6, wherein the selection information indicates at least one of
   1. the allocated first set of resources or a property thereof;
   2. an assignment of a specific Euler square matrix (F(n, k)) to be applied to the first set of resources;
   3. a specific subset allocated to the UE for a grant-based access; and/or
   4. a range of subsets to be used for communication for a grant-free access.

8. The UE of claim 7, wherein the UE is configured for receiving the selection information indicating the allocated first set of resources, indicating the assignment of the specific Euler square matrix (F(n, k)) and/or the indicating the range of subsets to be used for communication over a broadcast control channel; and/or
   wherein the UE is configured for receiving the selection information indicating the specific subset allocated to the UE over a user specific channel.

9. The UE of claim 1, wherein the controller is configured for selecting the at least one subset based on a grant-free access from the second number of predefined subsets or a subset thereof indicated by a selection information.

10. The UE of claim 1, wherein the controller is configured for selecting the at least one subset from a first version of the second number of predefined subsets during a first instance of time and from a second version of the second number of predefined subsets during a second instance of time, wherein the first version and the second version differ in view of a count of the second number and/or in view of a number of resources comprised in the subset.

11. The UE of claim 1, wherein the UE is configured for selecting at least two subsets for communication.

12. A base station, BS, for operating at least a cell of a wireless network such that the wireless network utilizes a first number of resources for serving communicating UEs, the base station comprising:
   a wireless interface for communicating in the wireless network;
   wherein the base station is configured for operating the wireless network so as to support communication of the UEs by use of at least one subset from a second number of predefined subsets of the first number of resources;
   wherein the second number is larger than the first number and wherein the second number of predefined subsets is based on a mapping of the first number of resources into the second number of subsets.

13. The base station of 12, wherein the mapping is based on an Euler square-based mapping.

14. The base station of claim 12, wherein the BS is configured for:
   monitoring a number of communicating UEs served by the BS;
   adapting the second plurality of subsets in view of a count of the subsets and/or in view of a number of resources comprised in the subsets so as to acquire a second version of the second plurality; and
   operating at least the cell of the wireless network based on second version of the second plurality based on the number of communicating UEs.

15. The base station of claim 12, wherein the first number of resource elements is orthogonal with respect to each other, wherein the BS is configured for:
   monitoring a number of communicating UEs served by the BS; and
   serving the UEs so as to use the orthogonal resources when the number of UE is below a number threshold; and for serving the UE so as to use the second plurality of subsets when the number of UE is at least the number threshold or above the threshold.

16. The base station of claim 12, wherein the base station is configured for transmitting, to at least one UE a selection information indicating a subset to be used by the at least one UE, wherein the selection information indicates at least one of
   1. the allocated first set of resources or a property thereof;
   2. an assignment of a specific Euler square matrix (F(n, k)) to be applied to the first set of resources;
   3. a specific subset allocated to the UE for a grant-based access; and/or
   4. a range of subsets to be used for communication for a grant-free access.

17. The base station of claim 16, wherein the base station is configured for transmitting the selection information indicating the range of subsets to be used for communication for a grant-free access for a group of UEs or associated to the cell of the wireless network.

18. The base station of claim 12, wherein the base station is configured for allocating the first number of resources to the second number of subsets during a first instance of time and for allocating a second, reduced number of resources to the same number of subsets during a second instance of time.

19. Network comprising:
   at least one UE for operating in a wireless network, wherein the wireless network utilizes a first number of resources for serving communicating UEs, the UE comprising:
      a wireless interface for communicating in the wireless network;
      a controller configured for selecting, for communicating in the wireless network, from a second number of predefined subsets of the first number of resources, at least one subset;
      wherein the second number is larger than the first number and wherein the second number of predefined subsets is based on a mapping of the first number of resources into the second number of subsets;
   at least one base station, BS, for operating at least a cell of a wireless network such that the wireless network utilizes a first number of resources for serving communicating UEs, the base station comprising:
      a wireless interface for communicating in the wireless network;
      wherein the base station is configured for operating the wireless network so as to support communication of the UEs by use of at least one subset from a second number of predefined subsets of the first number of resources;
      wherein the second number is larger than the first number and wherein the second number of predefined subsets is based on a mapping of the first number of resources into the second number of subsets.

20. Method for operating a user equipment, UE, in a wireless network, wherein the wireless network utilizes a first number of resources for serving communicating UEs, the method comprising:
   communicating in the wireless network;
   selecting, for communicating in the wireless network, from a second number of predefined subsets of the first number of resources, at least one subset;
   wherein the second number is larger than the first number and wherein the second number of predefined subsets is based on a mapping of the first number of resources into the second number of subsets.

21. Method for operating a base station such that a wireless network utilizes a first number of resources for serving communicating UEs, the method comprising:
   communicating in the wireless network; and
   operating the wireless network so as to support communication of the UEs by use of at least one subset from a second number of predefined subsets of the first number of resources;
   wherein the second number is larger than the first number and wherein the second number of predefined subsets is based on a mapping of the first number of resources into the second number of subsets.

22. A non-transitory digital storage medium having a computer program stored thereon to perform the method for operating a user equipment, UE, in a wireless network, wherein the wireless network utilizes a first number of resources for serving communicating UEs, the method comprising:
   communicating in the wireless network;

selecting, for communicating in the wireless network, from a second number of predefined subsets of the first number of resources, at least one subset;

wherein the second number is larger than the first number and wherein the second number of predefined subsets is based on a mapping of the first number of resources into the second number of subsets, when said computer program is run by a computer.

23. A non-transitory digital storage medium having a computer program stored thereon to perform the method for operating a base station such that a wireless network utilizes a first number of resources for serving communicating UEs, the method comprising:

communicating in the wireless network; and operating the wireless network so as to support communication of the UEs by use of at least one subset from a second number of predefined subsets of the first number of resources;

wherein the second number is larger than the first number and wherein the second number of predefined subsets is based on a mapping of the first number of resources into the second number of subsets, when said computer program is run by a computer.

* * * * *